(12) United States Patent
Lykkegaard et al.

(10) Patent No.: US 7,753,191 B2
(45) Date of Patent: Jul. 13, 2010

(54) SYSTEM AND METHOD FOR AUTOMATED HANDLING OF BAGGAGE OBJECTS

(75) Inventors: Uffe Lykkegaard, Arhus C (DK); Benny Larsen, Hornslet (DK); Ole Prydtz, Hjortshoj (DK); Per Barklin, Arhus (DK)

(73) Assignee: Crisplant A/S, Arhus N (DK)

( * ) Notice: Subject to any disclaimer, the term of this patent is extended or adjusted under 35 U.S.C. 154(b) by 165 days.

(21) Appl. No.: 11/991,961

(22) PCT Filed: Sep. 13, 2006

(86) PCT No.: PCT/DK2006/000503

§ 371 (c)(1),
(2), (4) Date: Mar. 13, 2008

(87) PCT Pub. No.: WO2007/031085

PCT Pub. Date: Mar. 22, 2007

(65) Prior Publication Data

US 2009/0114509 A1    May 7, 2009

(30) Foreign Application Priority Data

Sep. 13, 2005    (DK) ............................. 2005 01278
Mar. 27, 2006    (DK) ............................. 2006 00437

(51) Int. Cl.
*B65G 43/08* (2006.01)
(52) U.S. Cl. ..................... 198/401; 198/400; 198/502.2
(58) Field of Classification Search .................. 198/395, 198/400, 401, 411, 412, 414
See application file for complete search history.

(56) References Cited

U.S. PATENT DOCUMENTS

| 5,473,545 | A | 12/1995 | Schausten et al. |
| 5,501,571 | A | 3/1996 | Van Durrett et al. |
| 6,580,046 | B1 | 6/2003 | Koini et al. |
| 6,874,735 | B1 | 4/2005 | Audyli |
| 2004/0193311 | A1 | 9/2004 | Winkler |

FOREIGN PATENT DOCUMENTS

| DE | 38 44 598 A1 | 12/1989 |
| DE | 195 09 951 A1 | 9/1996 |
| DE | 100 12 090 A1 | 9/2001 |
| DE | 101 58 764 A1 | 6/2003 |
| DE | 102 38 249 A1 | 10/2003 |
| EP | 0742164 A1 | 11/1996 |

(Continued)

*Primary Examiner*—James R Bidwell
(74) *Attorney, Agent, or Firm*—Birch, Stewart, Kolasch & Birch, LLP

(57) ABSTRACT

The invention relates to automated handling of baggage objects of variable sizes, shapes and consistencies, including baggage in an airport. The invention involves measuring at least length in two directions of the objects while supported on a conveyor means, turning selected objects in an angle according to a selection in response to the measured lengths in relation to a predetermined value, and transferring objects to a storage device to collect a plurality of objects, and preferably while the objects are supported on a conveyor means. The selection in response to at least one predetermined value provides one basis for deciding whether to turn the objects before the objects are transferred to the storage device. This facilitates automatic transfer of baggage objects without manual intervention.

39 Claims, 15 Drawing Sheets

FOREIGN PATENT DOCUMENTS

| EP | 1 120 369 A | 8/2001 |
| EP | 1174374 A1 | 1/2002 |
| EP | 1 407 992 A | 4/2004 |
| EP | 1574459 A1 | 9/2005 |
| FR | 2582629 A1 | 12/1986 |
| IT | 1218629 A | 4/1990 |
| IT | 11-1234641 A | 5/1992 |
| NL | 1 023 904 C2 | 1/2005 |
| WO | WO-03/101833 A1 | 12/2003 |

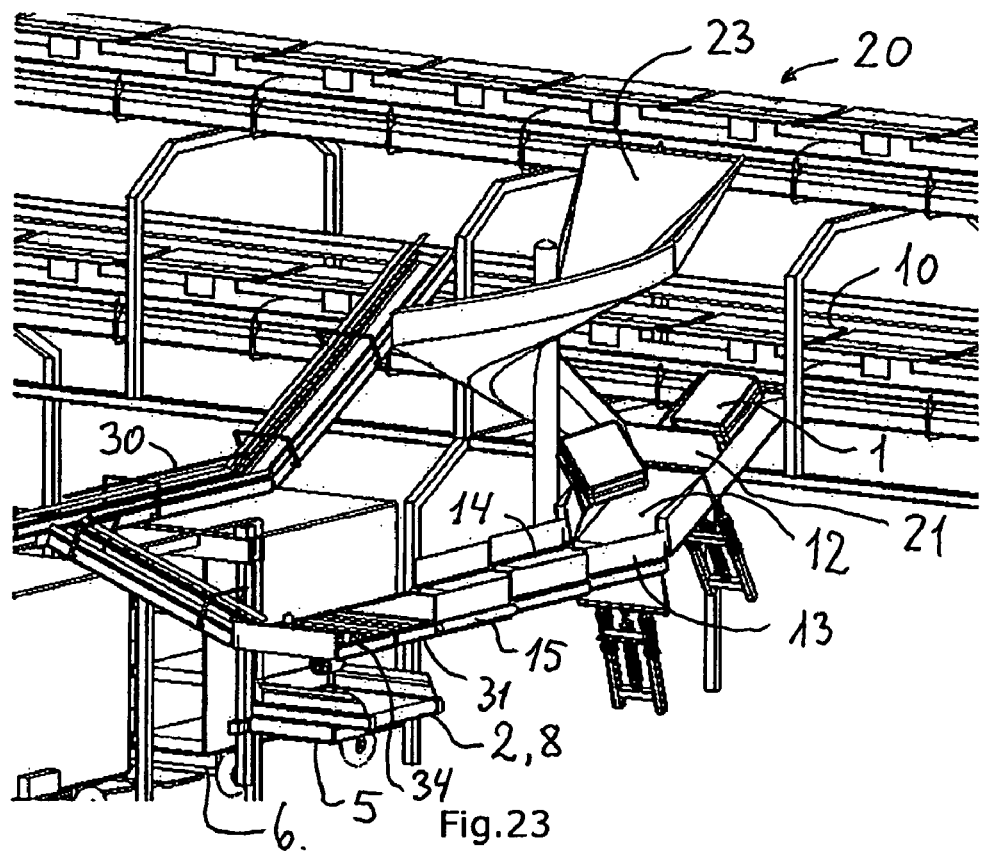
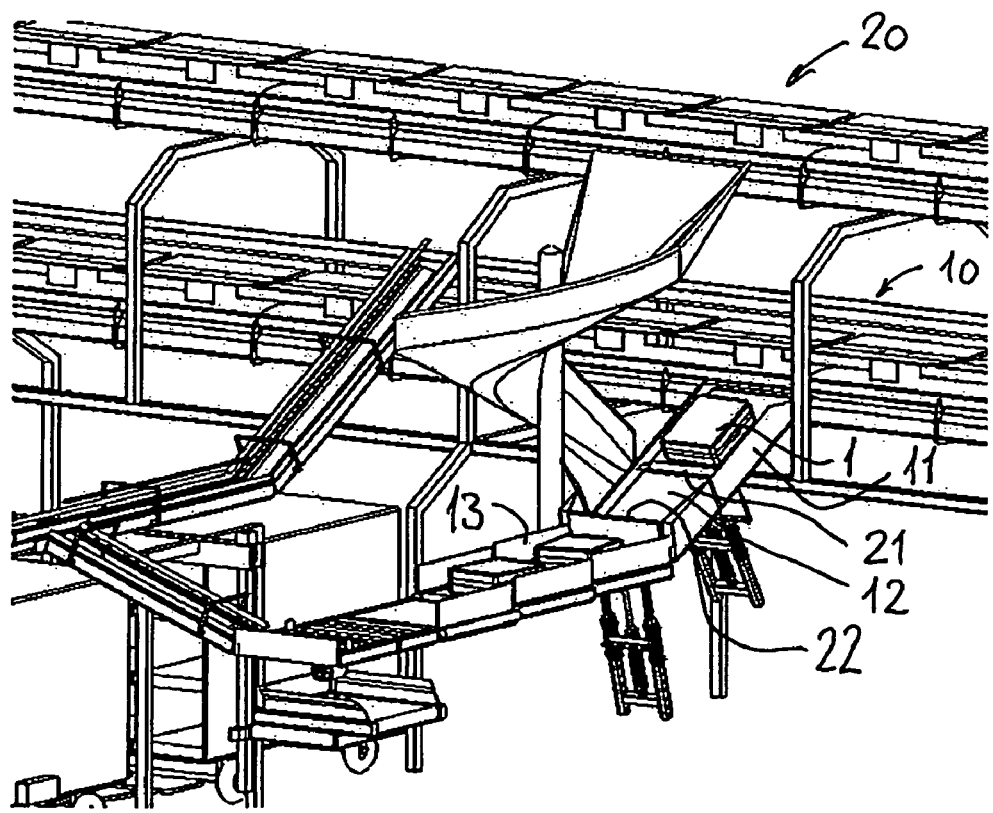
Fig. 24

SYSTEM AND METHOD FOR AUTOMATED HANDLING OF BAGGAGE OBJECTS

The present invention relates to a system and a method for automated transport and handling of baggage objects of variable sizes, shapes and consistencies, including baggage in an airport, and involves the use of a plurality of conveyor means for transporting objects from a first area to a second area where objects are loaded on or in storage devices.

When transporting and handling any objects of variable sizes, shapes and consistencies, as aforementioned, the nature of the variation in itself poses a general issue. With baggage objects the variation is immense. Until now there has been two alternative ways for dealing with the issue of variation, either handling the objects manually or replacing manual operators with automatic robots employing 3D camera vision systems for identifying objects and for providing control information and data. Manual operation is normally best avoided due to the same operations being repeated over and over, which leads to pour labour conditions and possible injuries. The robots usually run into problems because the gripping tools used are not as versatile as human hands. Also, it is difficult to program the robot and to take into account all, often unknown variations, and hence, always grip or engage the objects correctly. These factors lead to repeated failures where manual intervention is required.

The problems regarding automatic robots have been addressed in U.S. Pat. No. 6,580,046 B1 where it is suggested to record weight, shape, volume and consistency of baggage along with other relevant data, such as destination and flight class, in order to sort and divide the baggage into predetermined classifications and assign these to different loading stations in accordance with said baggage classifications. The loading stations are equipped with grippers, mechanical grippers or suction grippers selected to suit the different baggage classifications. The suggestion is, in this way, trying to remove the variation and thereby simplify the operation of and requirements to automatic robots. The downside is, however, the increased number of loading stations as well as all the equipment, which is necessary to record all the data and characteristics, which increase complexity and cost.

DE 3844598 discloses a system for the handling and transportation of passenger baggage in airports. In this system a trailer or label is provided having a trailer body and a suspension band which is attached to a luggage item. The baggage item is conveyed further via a conveyor and grasped by a gripper, after which a loader loads the conveyed baggage item into a container. One disadvantage of such a system is that a check-in operator has to manually locate the handle of the baggage object and bring the object into an upright position as well as connect the handle to a weighing beam before the trailers can be non-manually attached to each baggage object. The trailer is then used as a connection means for gripping during a following non-manual handling, whereby problems of gripping the objects as such and having to compensate for different size, shape and consistency is avoided. The trailer must however be continuously held in order not to lose contact and is applied already at check-in and is hence not suited for commercial airports where the baggage may be transported thousands of metres before it is stored in containers or wagons.

One object of the invention is to provide a system and a method that allow transport and handling of baggage objects of variable sizes, shapes and consistencies, including in a commercial airport, and ensures reliable automatic operation. Another object is to provide a solution for automatically transferring a random sequence of baggage objects to a storage device. A further object is to provide a solution to the above-mentioned issues. Other objects appear from the claims, description and drawings.

One aspect of the invention involves a system comprising:
control means for controlling automatic operation of the system,
measurement means for measuring at least length in two substantially perpendicular directions of the objects while the objects are supported on conveyor means, said directions being substantially parallel to a supporting surface of a conveyor means supporting the objects while being measured, and where at least one of said directions is along or substantially parallel to a side face of the objects,
loading means provided for receiving objects from the conveyor means and for transferring said objects according to a preselected transfer algorithm to at least one storage device to collect a plurality of objects, and
orientation means for selectively turning objects in a substantially horizontal plane, while said objects are supported on conveyor means, and where the control means are adapted to control the orientation of selected objects according to a selection in response to at least the measured lengths in relation to a predetermined value, before the objects are transferred to the storage device.

By measuring at least length in two substantially perpendicular directions of the objects while the objects are supported on conveyor means, said directions being substantially parallel to a supporting surface of a conveyor means supporting the objects while they are measured, at least one of said directions being along or substantially parallel to a side face of the objects, information regarding the size of the objects is obtained. This information in response to at least one predetermined value provides a basis for deciding whether to turn the objects before the objects are transferred to the storage device. This enables automatic transfer and handling of objects, which from case to case may have an extent that would not allow transfer to the storage device, e.g. because of the objects being too long or too wide. The operation may also be performed without manual intervention. Also, objects may be transferred to any storage device which is suitable according to the information regarding the lengths, or to a certain suitable position in or on a storage device. A further advantage is that objects may selectively be oriented, in order to improve packing density in or on the storage device by selecting the optimum orientation of each object based on information regarding the storage device, e.g. at least one predetermined value describing width, depth etc. of the storage device.

In one embodiment the system may comprise alignment means for aligning angular orientation of the objects before said objects are measured and while said objects are supported on conveyor means, and where the control means, according to a selection in response to at least the measured lengths in relation to a predetermined value, are adapted to control the orientation means to provide a turn of selected objects in a predetermined angle between 80 and 100 degrees, relative to a non-selected object, before the objects are transferred to the storage device. By angularly aligning the objects a pre-orientation is obtained, whereby the selected orientation may be restricted to a predetermined angle in contrast to any given angle. This simplifies the operation. A turning angle between 80 and 100 degrees relative to a non-selected object is advantageous since a majority of the objects will normally be substantially rectangular, oval, or have another shape which is longer in one direction than in another, and perpendicular direction. In one embodiment the predetermined angle may preferably be between 85 and 95 degrees, or more preferably between 89 and 91 degrees. About 90 degrees may also be used. The listed angles and intervals are well suited especially for parcels, packages, tools, goods and travel baggage. The loading means are advantageously positioned adjacent to the alignment means to directly receive aligned objects, whereby the risk that the objects may loose their alignment is reduced. In some systems the baggage objects may have a tendency to be naturally aligned or at least have a generally common orientation due to gravity or the design of the system. In such case specific alignment means are dispensable.

In another embodiment the measurement means may include means for measuring angular orientation of the objects while said objects are supported on conveyor means, and where the control means are adapted to control the orientation means to turn selected objects according to at least a selection in response to the measured lengths in relation to at least one predetermined value and according to the measured angular orientation of the objects, before the objects are transferred to the storage device. In this embodiment the objects are selectively oriented according to also the measured angular orientation, whereby the selected orientation may be directly performed. This solution may be used when the orientation of the baggage objects is random. In this embodiment it is preferred to use electronic image recording and processing means for both measuring the lengths as well as measuring the angular orientations of the objects.

The orientation means may preferably be integrated with the loading means. The loading means receives and transfers the objects to at least one storage device, which includes time-consuming movement between several positions. When the orientation means are integrated, the turning may be performed during said movement, and hence additional time to perform this operation is avoided.

The orientation means preferably comprise a pushing device including a pusher element and means for moving the pusher element in a direction transverse of the conveyor means. Objects may hereby be turned in a substantially horizontal plane, while they are supported on the conveyor means. By turning the objects into a different orientation can be obtained. This is done dependent on whether an object is or is not oriented in a desired way. The pushing device is preferably being positioned at an upstream end of a conveyor means or between two consecutive conveyor means. This may preferably include that the pushing device is placed upstream to the alignment means.

In a preferred embodiment the alignment means may include a straight barrier element which the objects are forced against by a conveyor means, and where the barrier element is moved away following alignment to provide free passage of aligned objects.

In another embodiment the measurement means may include two substantially perpendicular rows of photocells, where each row comprises a sequence of photocells, and where the number of activated photocells in each row provide a measurement of the length of the objects in a direction along each row. This provides a simple design that for some uses gives sufficiently accurate measurements. The measurement means may also include electronic image recording and processing means, which may provide a more accurate measurement, but also may provide information such as with respect to baggage, presence and/or position of handles, wheels, etc. Measurement means including electronic image recording and processing means may also be used to determine angular orientation of the objects, which information afterwards may be used to control orientation means to orientate the objects in response to the determined angular orientation.

In a further embodiment the loading means may include a conveyor means, preferably of a belt or roller type conveyor, connected to a manipulator, said manipulator being provided for moving the conveyor means along at least two axes, said axes being substantially perpendicular. Use of conveyor means ensures safe receipt and transfer of objects to and from the loading means. Preferably, the objects are transferred to the loading means in a direction parallel to a longitudinal axis of the manipulator. This allows the loading means to approach the transfer position, where measured objects are received, along the longitudinal axis of the manipulator, whereby separate means for enabling such a movement may be avoided. The movement is obtained by using the already present manipulator, preferably in the direction of the longitudinal axis of the manipulator. More preferably, one end or a part of the longitudinal axis of the manipulator may be placed directly at the transfer position, such that the loading means may be moved be the manipulator directly to the transfer position, e.g. by the measurement means or by the orientation means or by the alignment means.

In yet another embodiment the system may include object detection means which detect the position of an object on the conveyor means when received, where the detected position is used to control the manipulator such that the object on the conveyor means is moved to a centered position relative to the storage device, before the object is transferred to said storage device. A centering of the object, before transferal, improves the operation of the system and reduces the risk of faults, because the centering increases the precision of the transfer position. The object detection means may e.g. be placed on the loading means.

The system may include a storage device adapted to provide common transport for a plurality of objects. This could be a vehicle, a common package, a film wrapped package e.g. placed on a pallet, etc.

In still another embodiment the system may include at least one storage device comprising a plurality of vertically or horizontally distributed storage positions wherein each at least two objects may be transferred to and stored in. This provides the advantage that the number of positions the loading means needs to move to is reduced, because more objects may be transferred in the same position and received by the conveyor means.

In a further embodiment of the system a number of objects are transported on the conveyor means while placed on tray-like supporting members, and the system comprises means for unloading objects from said supporting members as well as transport means for transporting empty supporting members. This is advantageous for handling fragile or "soft" objects or objects having long extending straps which may be trapped during handling. Also, means for unloading may comprise means for measuring angular orientation of the supporting members, for orienting the supporting members by rotation to prepare said member for tilting, for holding the supporting members during tilting as well as for tilting the supporting members to perform an unloading operation, where the supporting members preferably are tilted about an axis substantially parallel to a longer side of said supporting members. The supporting members are hereby rotated to a pre-selected orientation before tilting, which enables the tilting to be performed. The chosen tilting axis is less harmful to objects because an axis parallel to a longer side means that the objects are raised less during the tilting operation.

In a preferred embodiment a plurality of individually actuatable conveyor means and object detection means are placed upstream relative to the measurement means for detecting transported objects and separating a sequence of objects, such that objects arrive individually at said measurement means. This improves stability of the operation of the system, when the objects are separated at an early stage, and the measurement operations are performed more securely. But of course there may be situations where two or more, e.g. smaller objects, may advantageously be kept together and handled as one large object.

In another preferred embodiment a number of blocking devices may be placed on or between the conveyor means to separate individual objects in order to securely maintain a given sequence of objects. This is especially important when handling baggage in an airport such that full tracking of the baggage is ensured. Baggage for more destinations may thereby be handled at the same time. The blocking devices are preferably placed at positions where the conveyor means transport the objects in an upward or downward direction. In these positions the risk that one object changes position with another object is increased. It may e.g. happen that an object rolls over another object because of gravity and because of its shape, cylindrical objects e.g. naturally have such a tendency. The blocking devices comprise a plate-like or finger-like component that may be raised and lowered to respectively perform blocking or un-blocking of objects. This ensures the function of the blocking devices.

Another aspect of the invention involves a method comprising steps of:

measuring at least length in two substantially perpendicular directions of the objects while the objects are supported on conveyor means, said directions being substantially parallel to a supporting surface of a conveyor means supporting the objects while they are measured, and where at least one of said directions is along or substantially parallel to a side face of the objects, turning selected objects in a substantially horizontal plane, while said objects are supported on conveyor means, to control the orientation of the objects according to a selection in response to at least the measured lengths in relation to a predetermined value, and transferring oriented objects according to a preselected transfer algorithm to at least one storage device to collect a plurality of objects.

The method preferably includes that angular orientation of the objects is initially aligned and the objects measured, after which selected objects are moved to a position upstream from a position where alignment was initially performed. Here the selected objects are turned by moving a pusher element in a direction transverse of the conveyor means to push or draw one end of the objects to a different position. Following this the objects are then moved downstream and aligned again. In this way the orientation of the objects may be controlled according to a selection in response to at least the measured lengths in relation to at least one predetermined value. These steps take place before the objects are transferred to the storage device. By performing the selective turns upstream it is obtained that the same alignment means may be reused when the objects are moved downstream again. To improve the selective turning of baggage objects, a pusher element adapted to provide a push or pull in a direction substantially along the conveyor means or at an acute angle to the conveyor means may be employed in addition to a pusher element acting transversely to the conveyor means.

The conveyor means are activated in an upstream direction while the selected objects are being pushed or drawn to a different position in order to push the object against the pusher element in upstream direction to increase the turn of the objects. A turning angle of at least 90 degrees is hereby possible using only a pusher element and the conveyor. Activation in the upstream, i.e. reverse direction of the conveyor is most effective when started after the pusher element has been moved halfway across the conveyor or more. The actual activation time may be chosen dependent on the size of the objects. The method may include measuring the objects again after turning. This can be used as a verification where it is checked that the objects have actually been turned into the desired orientation in order to exclude errors.

Preferably, the selection, in response to the measured lengths, involves that objects, where one length is larger and the other length is smaller than the predetermined value, are turned if a side of the object, having said larger length, is facing the storage device at the time of transferal. The predetermined value could, e.g. be the width of a storage slot or position in or on the storage device. In this way the measurement provides a compatibility check of whether the object may fit into the slot, and if not, the object is turned such that the smaller length will, instead, face the storage device. Also preferably, the selection in response to the measured lengths involves that objects, where both lengths are smaller than the predetermined value, are turned if a side of the object, having a length that is smaller than the other length, is facing the storage device at the time of transferal. In this way the larger length will face the storage device, whereby the smaller length will be taking up the space in or on the storage device. This optimises the packing density when more than one object is transferred at the same position, such as e.g. when objects are transferred to a conveyor means in or on the storage device.

The predetermined value may preferably correspond to a width of a storage position on or in the storage device, or less. To obtain functional stability, it is preferred that the value is less than the width, but depending on accuracy in handling and measurement, the value may correspond to the width.

The transfer algorithm may include selecting a position from a plurality of positions in or on a storage device, or selecting a specific storage device from a plurality of storage devices, according to destination in order to load storage devices with objects destined for more than one destination. This provides a sorting function of the system and may, e.g., be used for simultaneous loading of baggage for two or more flight destinations in an airport.

The transfer algorithm may include selecting a position from a plurality of positions in or on a storage device or selecting a specific storage device from a plurality of storage devices according to travel class. The objects may hereby e.g. be sorted in order to facilitate easy separation and identification when stored objects are to be transferred away from the storage device.

The transfer algorithm may include selecting a position from a plurality of positions in or on a storage device or selecting a specific storage device from a plurality of storage devices according to weight. This may e.g. be used for separating heavy objects from light objects, e.g. to make it easier for the personnel, who is loading the cargo bay of an airplane, to distribute the weight evenly and obtain balance. This may include comparing measured lengths with the weight to estimate density and not just weight alone.

The transfer algorithm may include selecting a position from a plurality of positions in or on a storage device or selecting a specific storage device from a plurality of storage devices according to at least one measured length. Different positions or different storage devices may be more suitable for one length than for another. Also, the transfer algorithm may include saving information regarding the selected positions in or on a storage device or the selected specific storage device and the according measured lengths of objects stored in said positions or specific devices. This feature may be used to optimise packing density by using information regarding already transferred and stored objects to select a suitable position or device in accordance with said information and the given measured length. Furthermore, at least two objects may be stored in each position or specific device and the transfer algorithm includes selecting a position from a plurality of positions in or on a storage device or selecting a specific storage device from a plurality of storage devices according to the information regarding previously selected positions in said positions or specific devices. This allows selection of a position or specific device with adequate remaining space, that the at least two objects may be stored together. Or, alternatively that an unused position or specific storage device may be selected if none are available with one or more objects already stored and having sufficient space for the further object in question according to its measured length.

Preferably the objects remain supported on conveyor means throughout the transport and handling until transferred to the storage device. This provides the advantage that specific areas need not be identified for engagement with e.g. grippers, tools, or the like. This ensures functional stability and that a wide variety of different objects, or types of objects, may be transported and handled.

The method may advantageously be used for handling baggage in an airport and where the baggage is transported, handled and transferred to the storage device essentially in a sequence determined exclusively in response to destination. It is hereby avoided to pre-sort the baggage according to any characteristics other than destination. The system may hereby be used in most airports of today without alteration of the general transport and handling system already installed.

LIST OF FIGURES

FIG. 23-24 are perspective views of elements comprised in yet another embodiment of a system according to the invention, where two sorter systems are involved.

The figures display simplified, exemplary elements of a system according to the invention and how it functions. The figures are merely included as information given as examples to a skilled person as to how the invention may be carried out.

Figure 1:
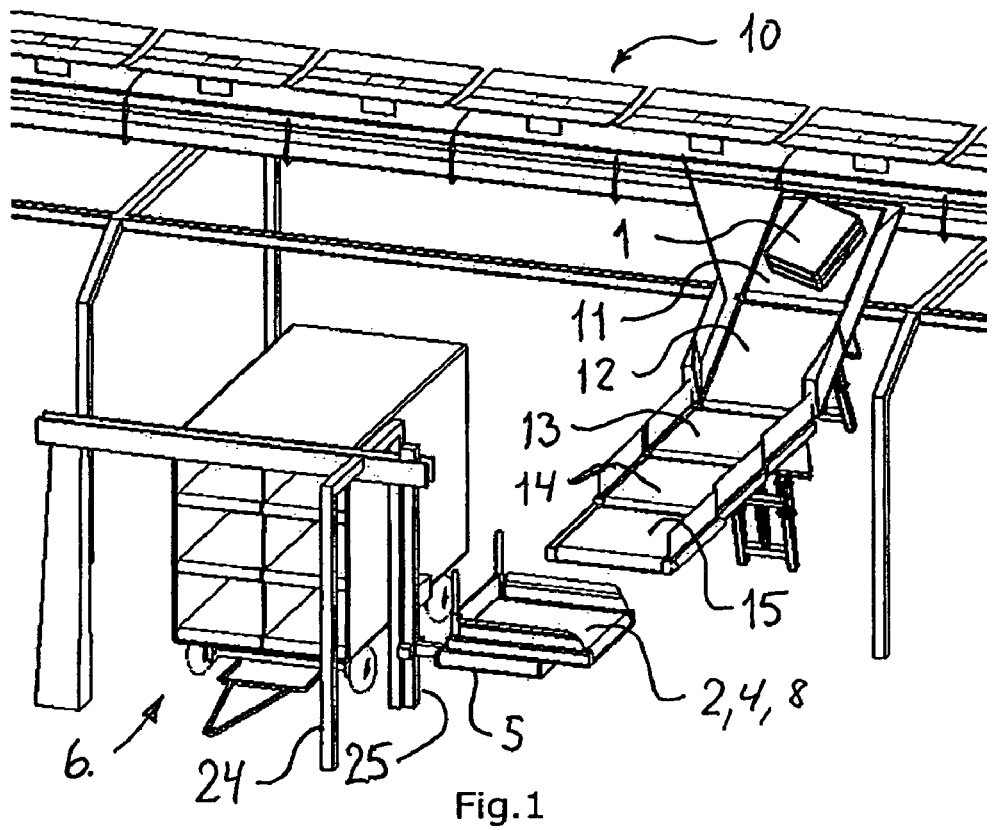
FIG. 1-2 are perspective views of elements comprised in an embodiment of a system according to the invention.
Figure 2:
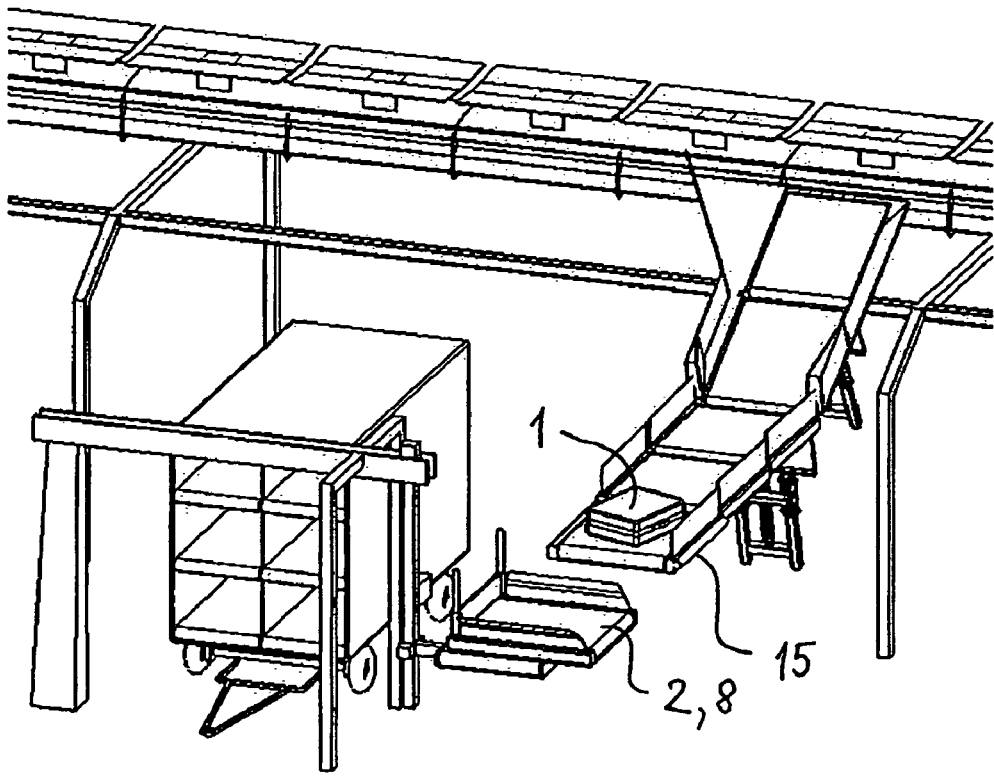
Figure 3:
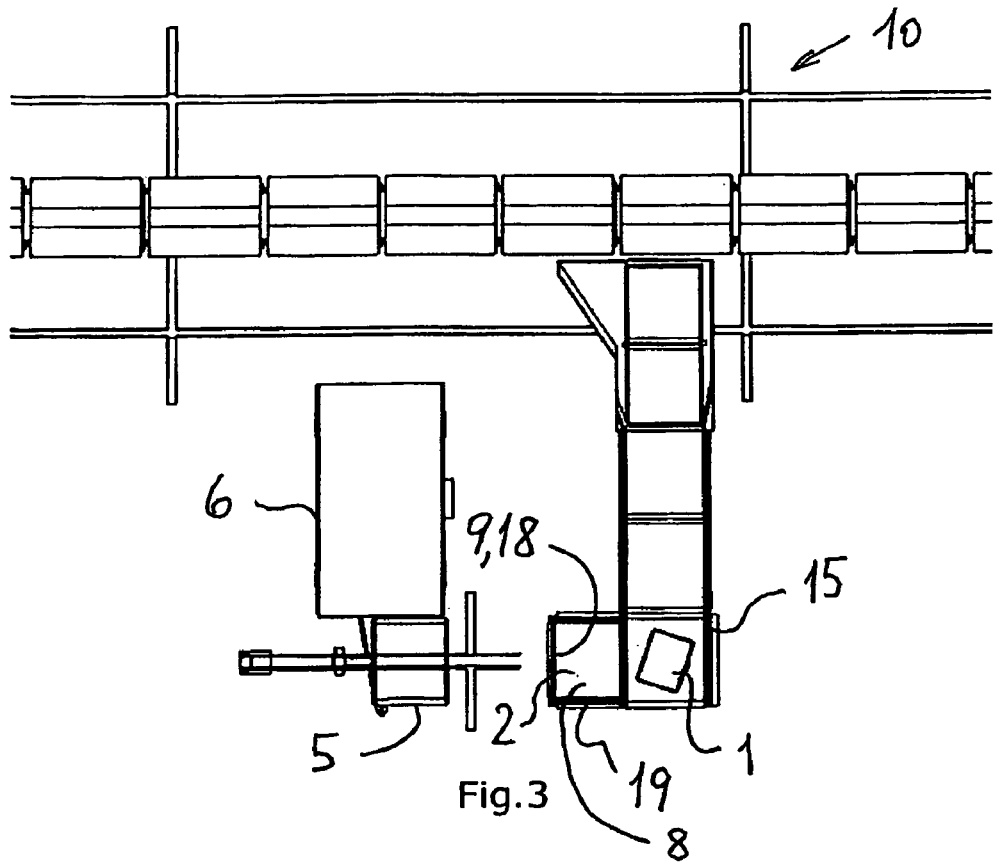
FIG. 3 is a top view of elements comprised in an embodiment of a system according to the invention.
Figure 4:
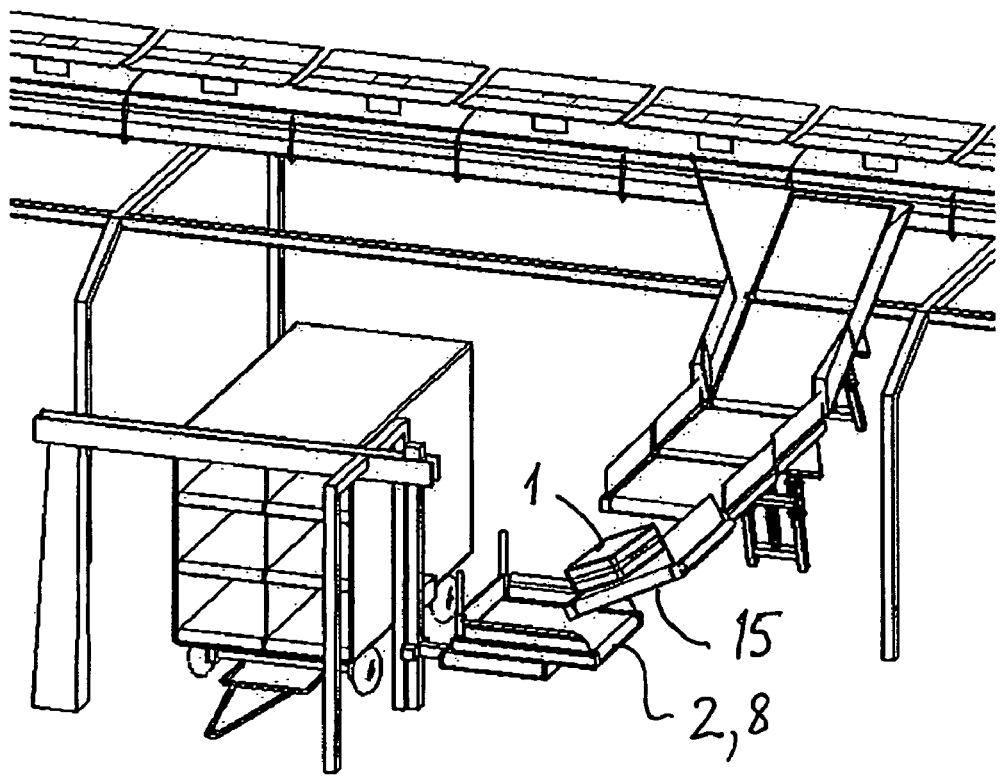
FIG. 4-10 are a sequence of perspective views of elements comprised in an embodiment of a system according to the invention, which show how an object may be transported and handled until transferred to a storage device.
Figure 5:
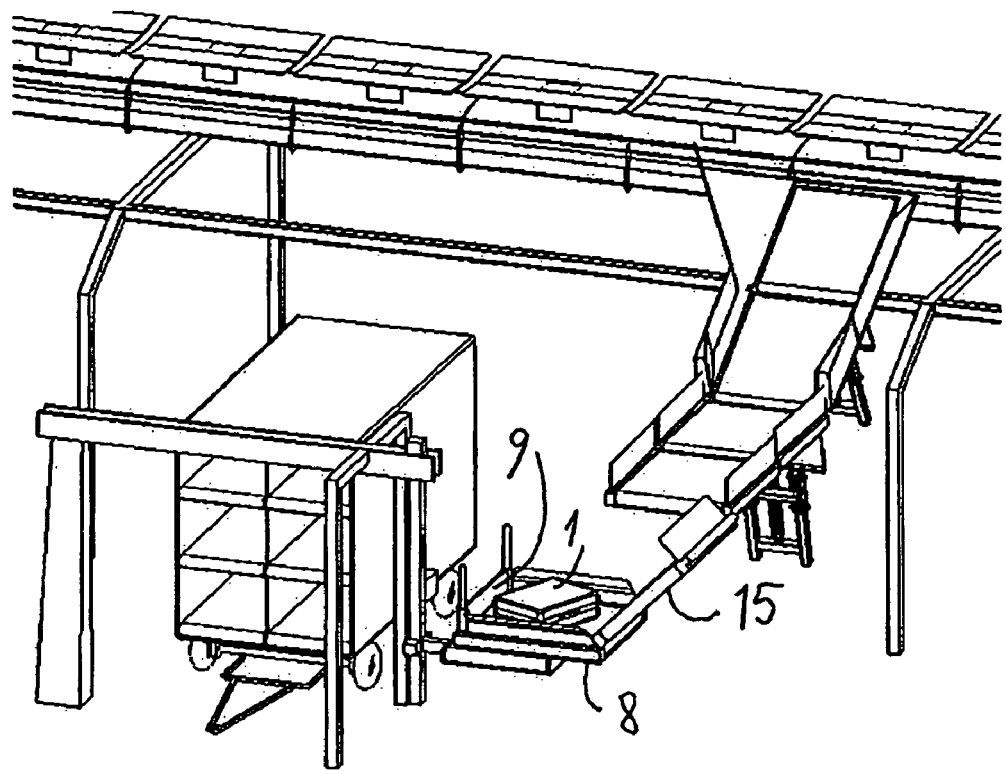
Figure 6:
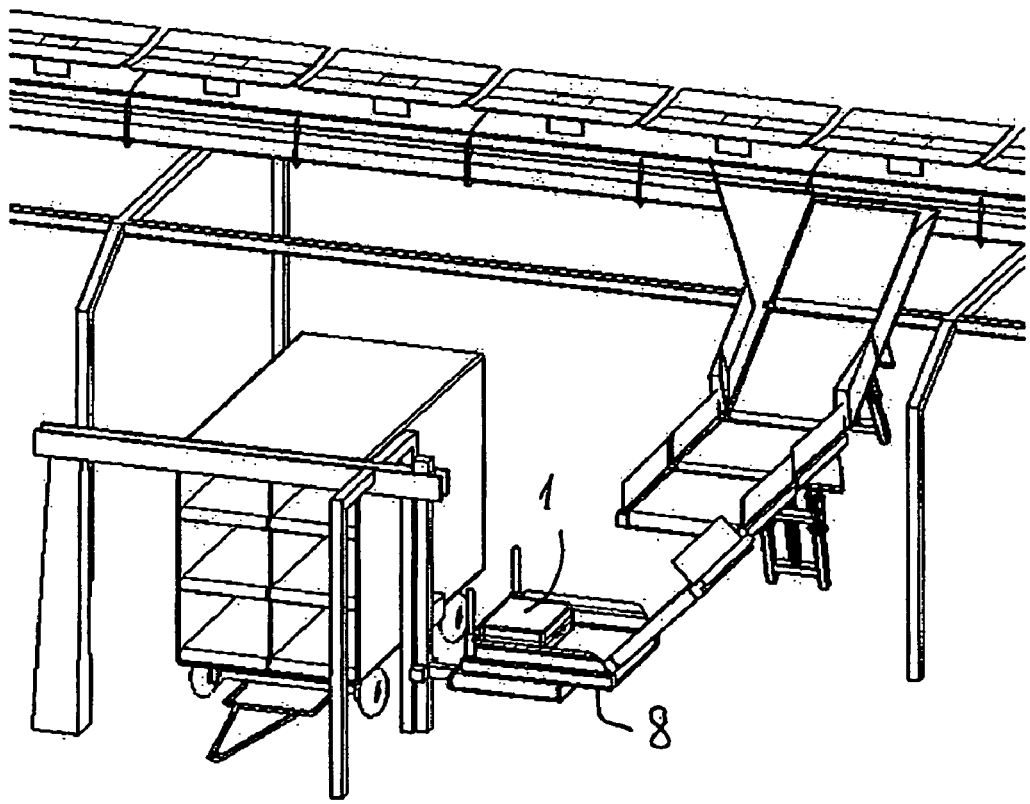
Figure 7:
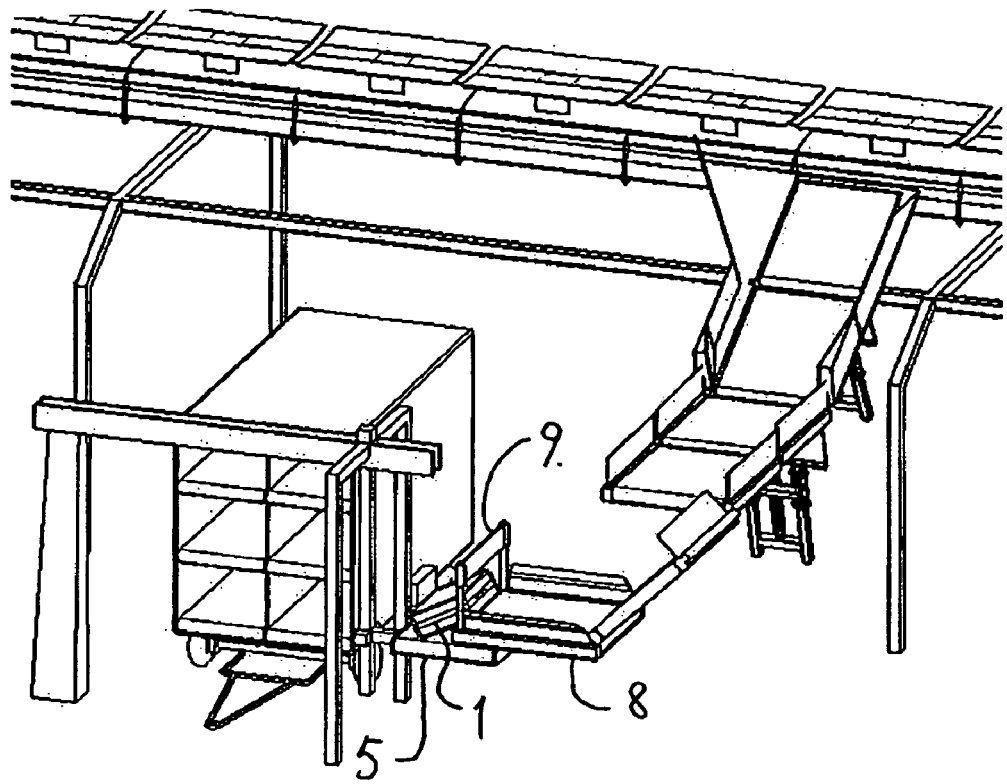
Figure 8:
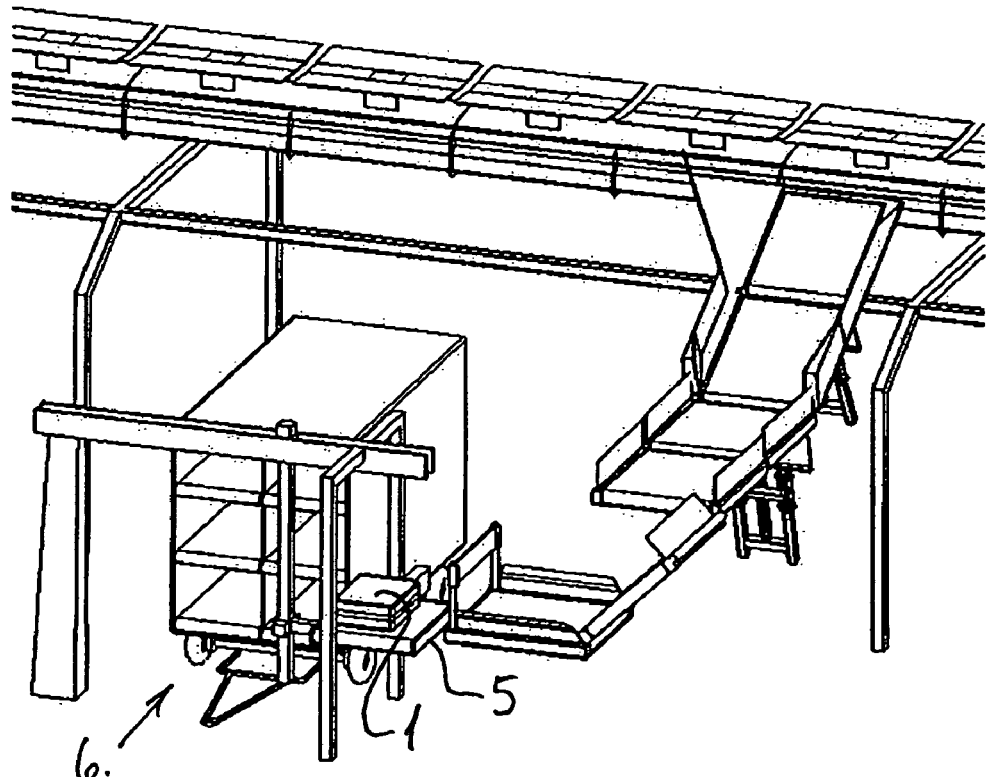
Figure 9:
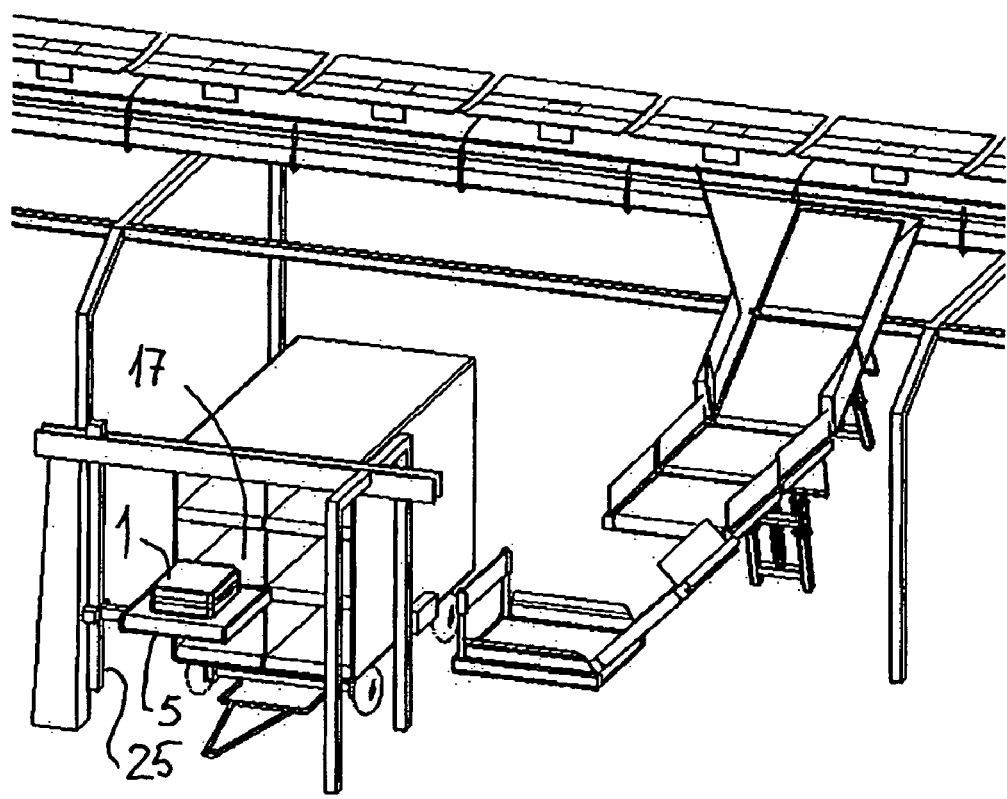
Figure 10:
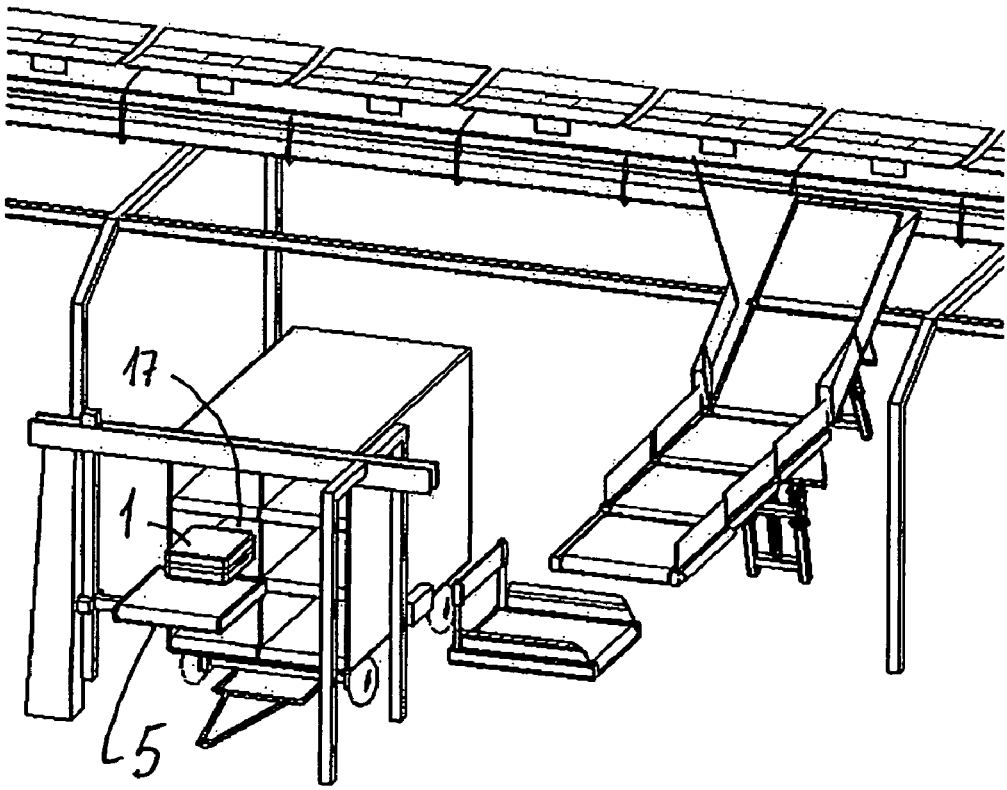

FIG. 1-15 show a sorter system 10, here a tilt tray sorter (other types of transport may also be used according to purpose), which discharges objects 1 to a series of conveyor means, where conveyor 11 is the first, followed by conveyors 12, 13, 14, 15 and 8. Each of the conveyors are individually actuatable such that objects 1 may be transferred from conveyor to conveyor, but also to enable that objects may be halted and temporarily stored on each conveyor. The latter means that several objects 1 may be accumulated on the conveyors 8, 11-15. Supporting frames for the conveyors are not displayed for reason of clarity of the figures, and are, however, trivial for the skilled person. The conveyors 8, 11-15 are depicted as belt conveyors, but may straight forward be substituted by roller conveyors, chain conveyors or similar types of conveyors, or by any other means capable of providing a supported advancing movement of the objects 1. Alignment means 2 and measurement means 4 are shown by the conveyor 8 as well as a loading means 5 comprising a two axis manipulator 25 and a support frame 24, and a storage device 6. In FIGS. 2 and 3 the object 1 of FIG. 1 has been advanced to a conveyor 15, wherefrom it is to be transferred to conveyor 8 with the alignment means 2, which is shown in FIG. 4, where the conveyor 15 is tilted to let the object 1 slide down on conveyor 8 with the alignment means 2. The conveyor is here a belt conveyor. FIG. 4 displays the sorter 10 from where an object 1 has been relayed to a conveyor 15. The alignment means 2 comprise a risible barrier 9, against which objects 1 may be forced by advancing the conveyor 8 to obtain alignment against the barrier 9. In the barrier 9, an array 18 of photocells is built-in. Also, in a side rail on the alignment means 2 an array 19 of photocells is built-in, cf. FIG. 3. This allows measurement of objects in two substantially perpendicular directions, when the objects 1 have been aligned. In FIGS. 5 and 6 it is displayed how an object 1 is advanced against a straight barrier 9 whereby the object is aligned, i.e. an angular correction of the orientation is obtained and in a way where one side of the object is adjacent to and in contact with the barrier 9. FIG. 6 displays the aligned situation. In FIGS. 7-10 it is displayed how the barrier 9 is raised to allow the object 1 to be transferred from the conveyor 8 to the loading means 5. The loading means here comprise a belt conveyor, but other types of conveyors could be used also, as well as e.g. a smooth receiving surface combined with a pusher element. The loading means 5 supported by the two axis manipulator 25 moves the object 1 into position in front of a storage position 17 in a storage device 6. From here it is transferred by activation of the conveyor on the loading means 5. A non-displayed array of photocells may be placed on the loading means to find the transverse position of the object 1 on the loading means, such that this information may be used to adjust or centre the object 1 relative to the storage position 17.

Figure 15:
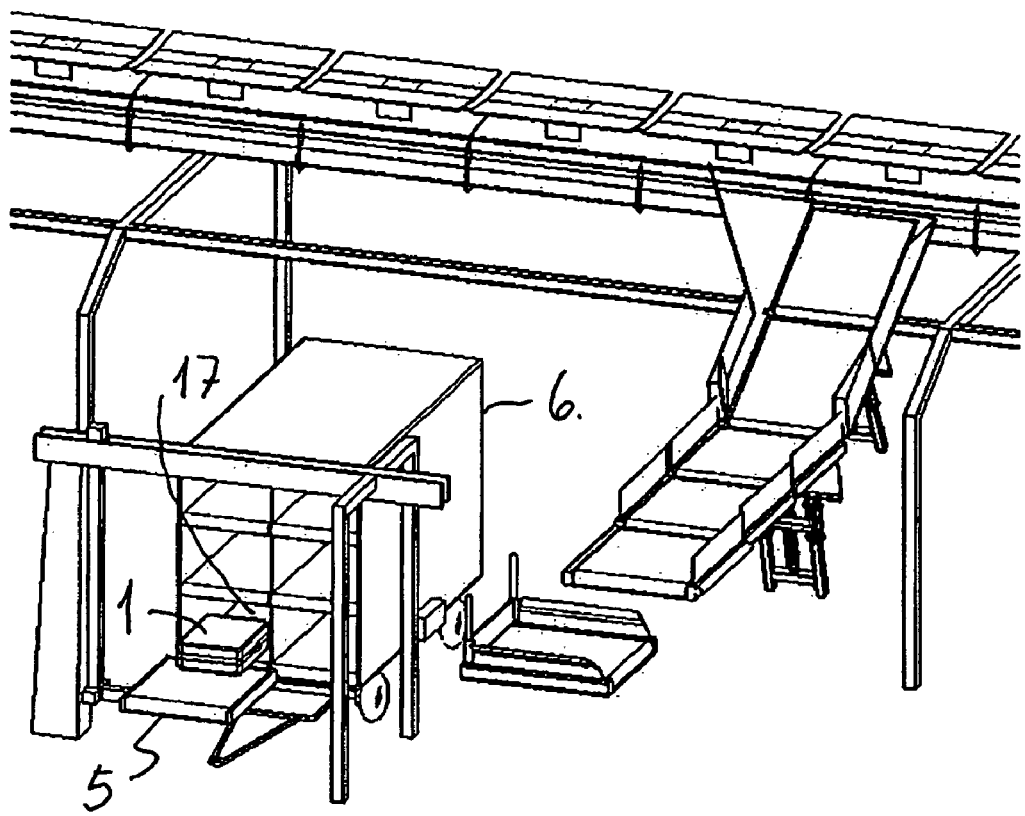

It is to be noted that the object 1 displayed in FIGS. 1-10 randomly has been discharged from the sorter 10, oriented in a way such that after alignment it fits directly into the storage position 17 because its shorter side is facing the storage device 6. In FIGS. 11-15 situations are depicted where an object 1, which is similar to the objects 1 in FIG. 1-10, is aligned with a shorter side facing the loading means 5, and a measurement performed with measurement means 4 reveals that the object 1 is too long to fit crosswise into a storage position 17. To solve this the loading means turns the object 1 (FIGS. 12-14) approximately 90 degrees counter-clockwise in a substantially horizontal plane. Of course, it could as well have been chosen to turn the object clockwise. This is a matter of choice. As shown in FIG. 15 this enables the object 1 to fit into the storage position 17 in the storage device 6. Had the object 1 been slightly less long than the width of the storage position 17, the 90 degree turn would preferably have been avoided. When more objects 1 are to be placed on the same storage position, the optimum packing density is obtained by making the best use of the packing space, hence the widest side which fits the storage position should face the storage position by transferal. Other issues may of course influence the decision whether to turn an object or not, such as availability of more storage positions, which are different in size.

Figure 16:
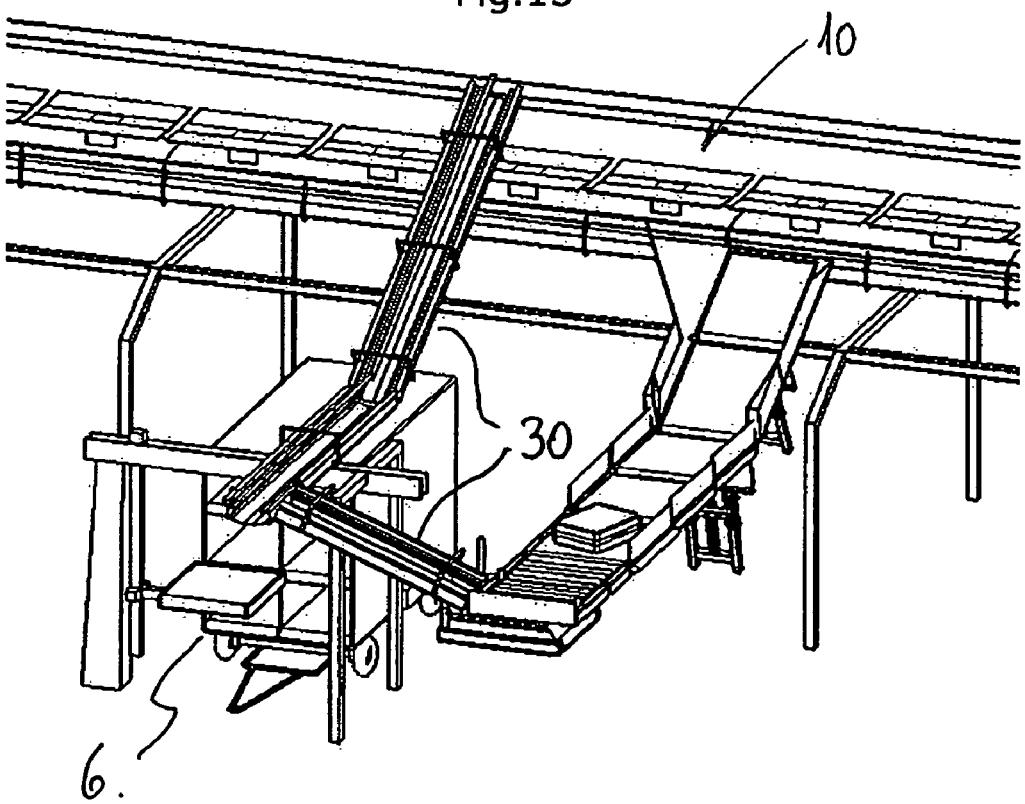
FIG. 16 is a perspective view of elements comprised in another embodiment of a system according to the invention.
Figure 17:
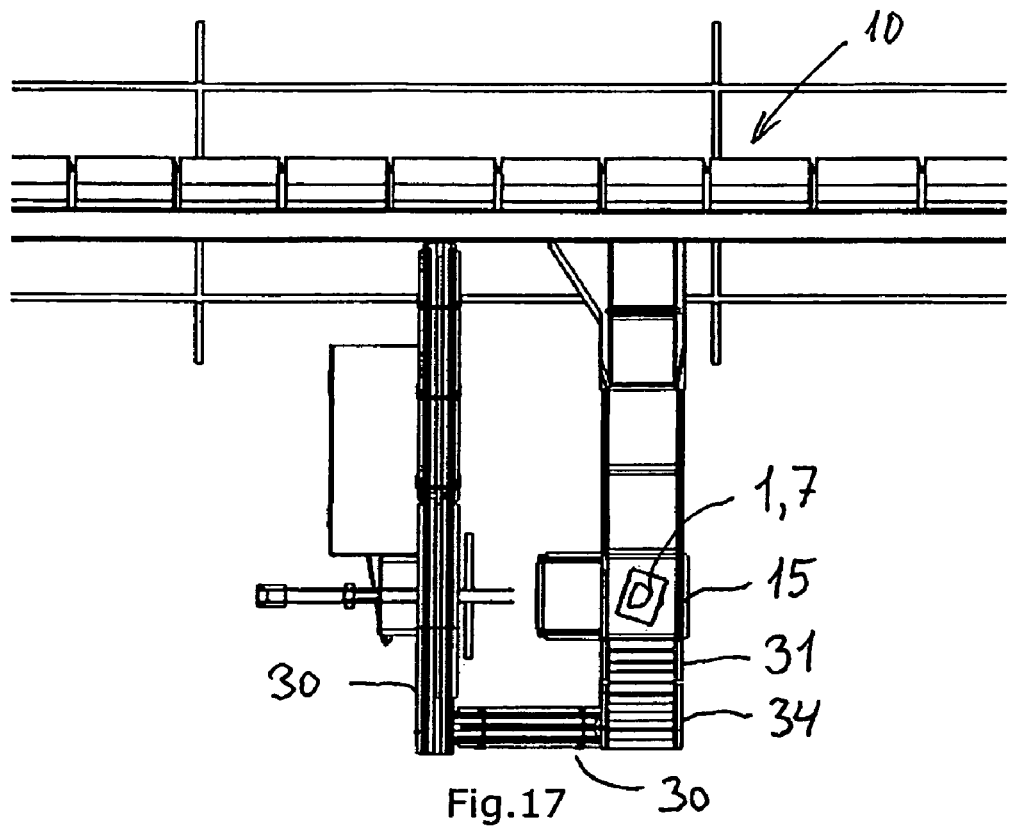
FIG. 17 is a top view of elements comprised in an embodiment of a system according to the invention, corresponding to FIG. 16.
Figure 18:
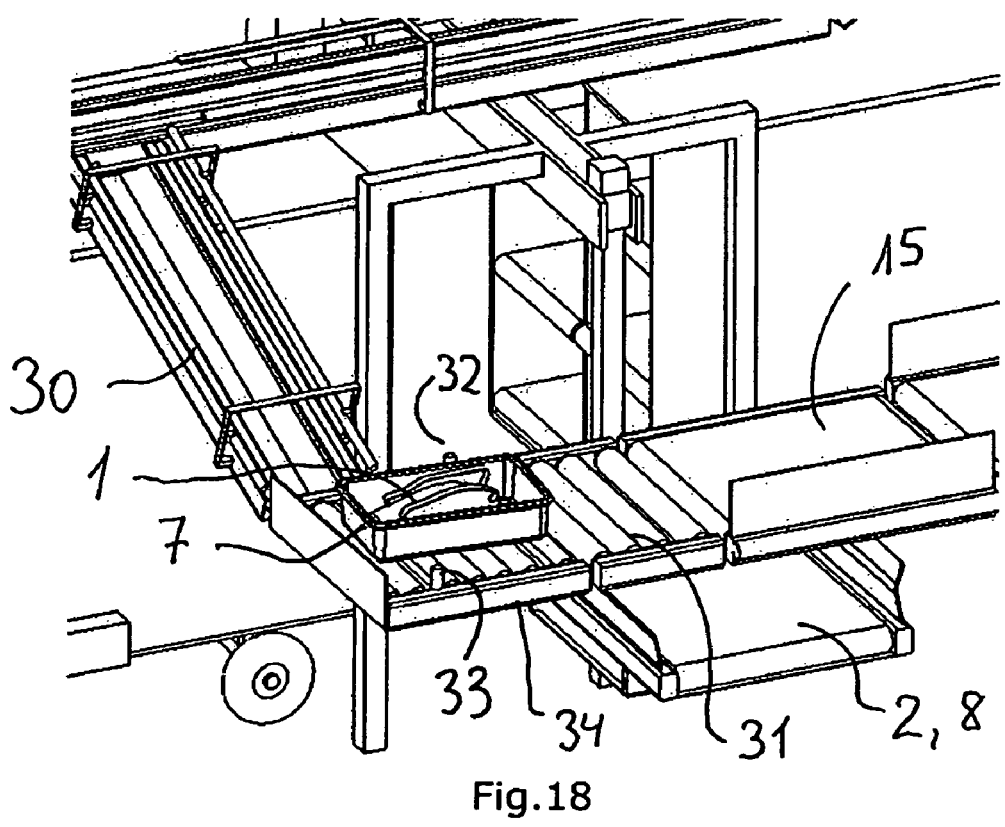
FIG. 18-22 are a sequence of perspective detail views of elements comprised in another embodiment of a system according to the invention, which shows how an object contained in a supporting member is emptied and how the supporting member is handled.
Figure 19:
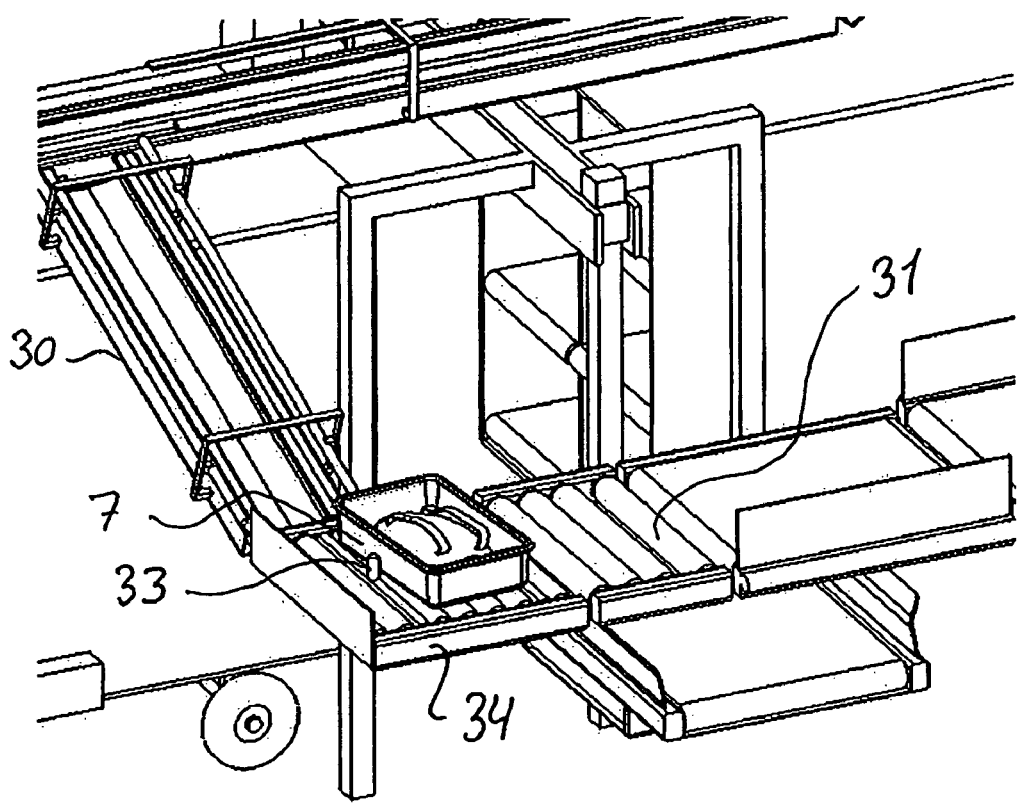
Figure 20:
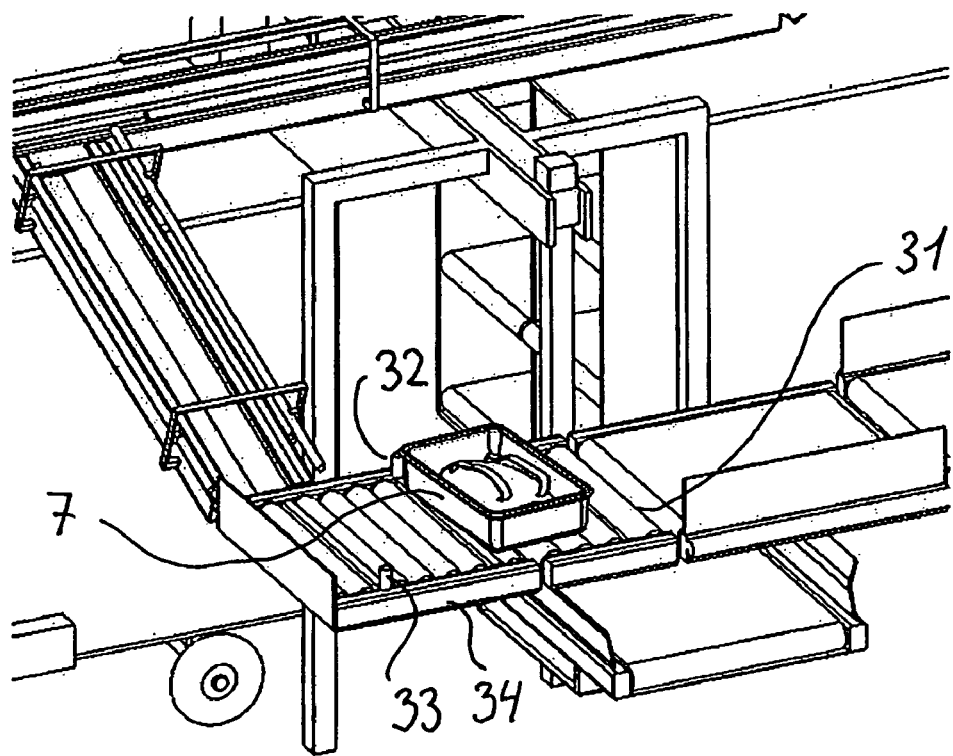
Figure 21:
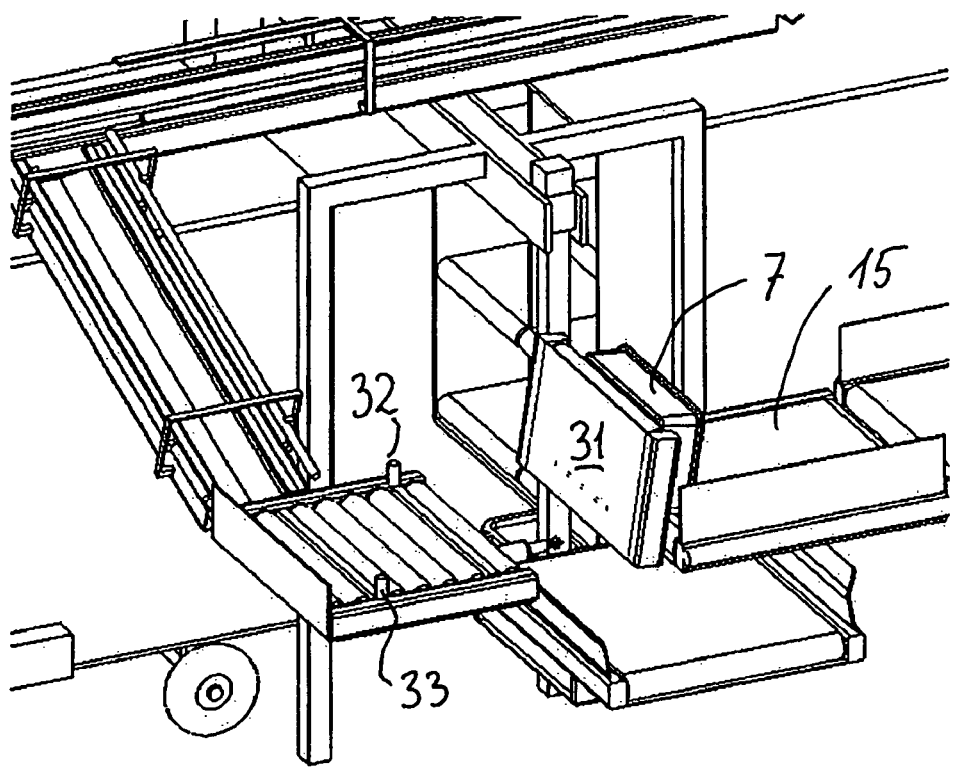
Figure 22:
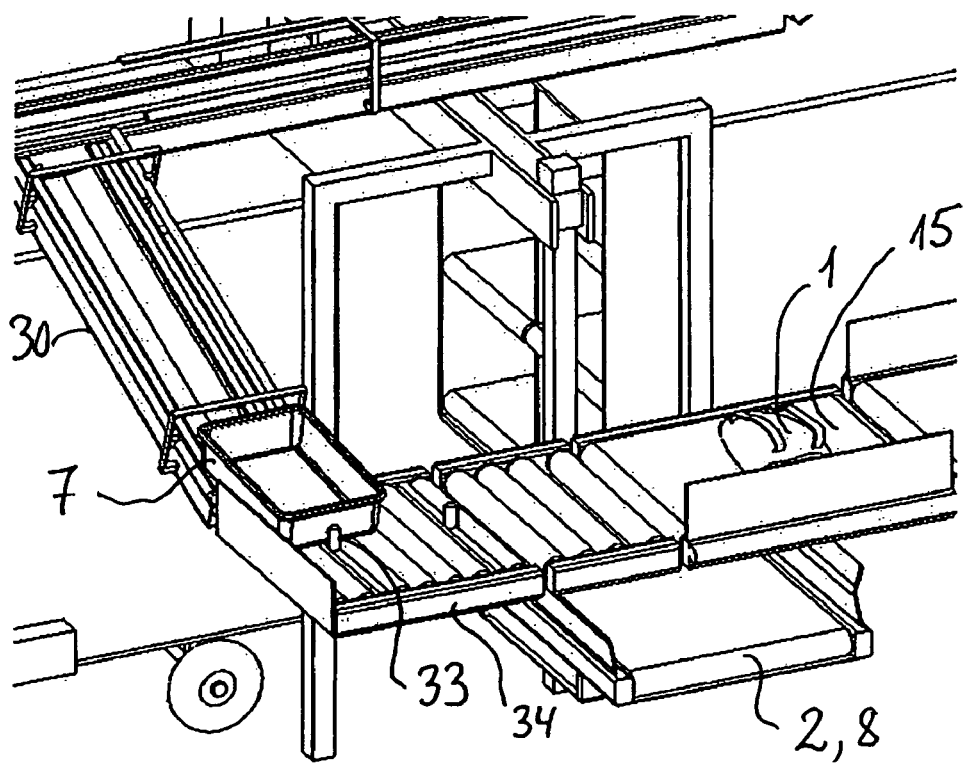

In FIGS. 16 and 17 it is displayed how a system, according to the invention, may comprise equipment 30 for handling tray-like supporting members 7 which are often used in airports for e.g. sacks and soft bags, which are fragile or which have large handles or straps. However, such supporting members 7 must be discharged before the objects 1 are transferred to the storage device 6. This is shown in FIGS. 17-22. When a supporting member 7 comprising an object 1 is discharged from a sorter 10 and advanced to a conveyor 15, it is transferred past a roller conveyor 31 and on to a second roller conveyor 34 for alignment prior to discharge. Dependent upon the orientation of the supporting member 7, which is detected by non-displayed means for measuring angular orientation of the supporting members (e.g. photocells), two alignment pins 32,33 are displaced to angularly orient the member 7 by rotation. After orientation, cf. FIG. 19, the supporting member 7 including the object 1 is returned to the conveyor 31, to which it is held (the gripping means are not displayed), before the conveyor 31 is tilted while holding the member 7, to discharge the object 1 to the conveyor 15. The conveyor 31 is then returned to its earlier position and the fixation released. After this the member 7 is advanced to the conveyor 34 from where it is transferred to the handling equipment 30 by a push from the alignment pin 33, cf. FIG. 22. In an airport the members 7 would be recycled to the check-in region for further use. The object 1 was discharged from the supporting member 7 to the conveyor 15. From thereon it may be transferred to a conveyor 8 with alignment means 2 and onwards, i.e. be handled similarly to the objects 1 depicted in FIGS. 1-15 until transferred to a storage device.

FIGS. 23 and 24 display a system where two sorters 10, 20 are used. Objects 1 are discharged from the lower sorter 10 to a conveyor 11 where they may be blocked with a first blocking device 21. The blocking device 21 has a plate-like shape for effectively blocking passage. Objects 1 are discharged from the higher sorter 20 via a winding chute 23 to a conveyor 12. When the blocking device 21 is activated, the risk of collision and change of sequence (order) of objects 1 is avoided, because objects 1 from the lower sorter 10 may be held back until objects from the higher sorter 20 are safely arrived at the conveyor 12. A second blocking device 22 is placed between conveyors 12 and 13 to prevent objects 1, from either the lower or higher sorter 10, 20, from overtaking other objects e.g. on the conveyor 13, whereby the sequence of the objects would be changed. The sequence of the baggage in an airport must normally be maintained for tracking reasons, especially in case baggage is handled which is destined for more destinations at the same time, or due to other various reasons. A mix-up of baggage is clearly undesired. FIG. 23 also displays conveyors 14, 15, 31 and 34 as well as handling equipment 30.

Also, a conveyor 8, alignment means 2, loading means 5 and a storage device 6 are shown.

Figure 25:
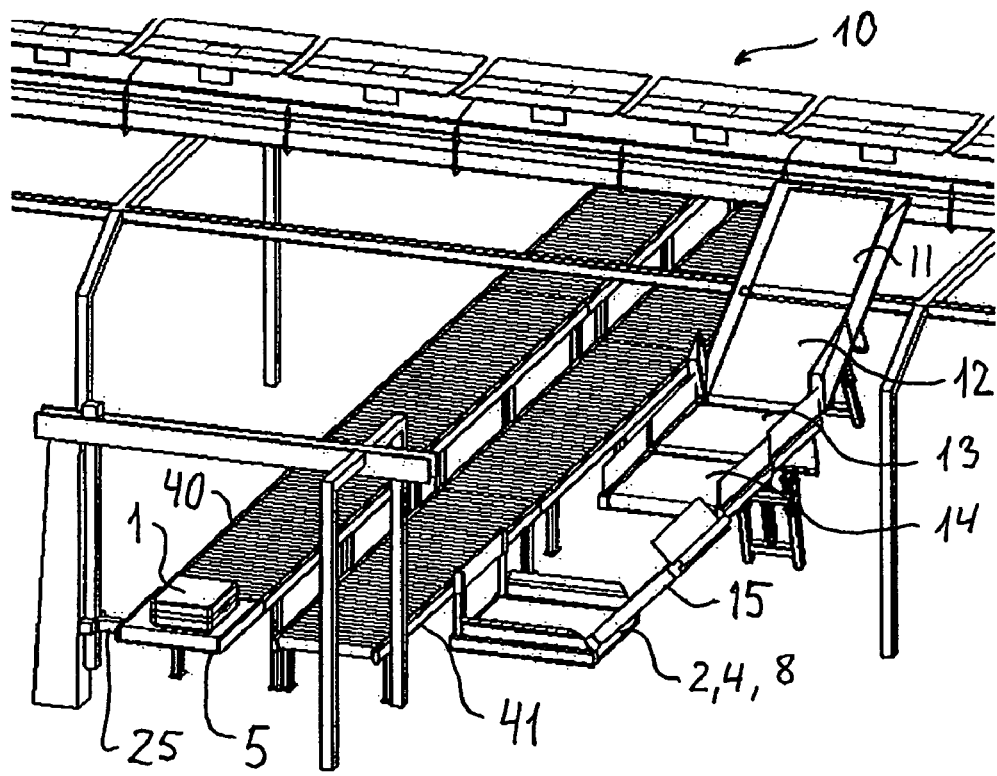
FIG. 25-26 are perspective views of elements comprised in further embodiments of a system according to the invention.

FIG. 25 shows a sorter system 10, which discharges objects 1 to a series of conveyor means, where conveyor 11 is the first, followed by conveyors 12, 13, 14, 15 and 8. Each of the conveyors are individually actuatable such that objects 1 may be transferred from conveyor to conveyor. Supporting frames for the conveyors are not displayed for reason of clarity of the figures, and are, however, trivial for the skilled person. The conveyors 8, 11-15 are depicted as belt conveyors, but may straight forward be substituted by roller conveyors, chain conveyors or similar types of conveyors, or by any other means capable of providing a supported advancing movement of the objects 1. Alignment means 2 and measurement means 4 are shown as well as a loading means 5 comprising a two axis manipulator 25 and two temporary storage devices in form of roller conveyors 40 and 41. After alignment and measurement, the object 1 is transferred to the conveyor 40 as depicted or alternatively to the conveyor 41 according to a preselected transfer algorithm for storage. Based on the measurements it is decided whether to turn the objects or not. Large objects may be placed on the conveyor 40 and smaller objects on the conveyor 41. Any suitable criterion may be chosen as a basis for deciding which objects go where. The procedure may also be used to orient baggage on the conveyors 40, 41 for storing before further manual handling.

Figure 26:
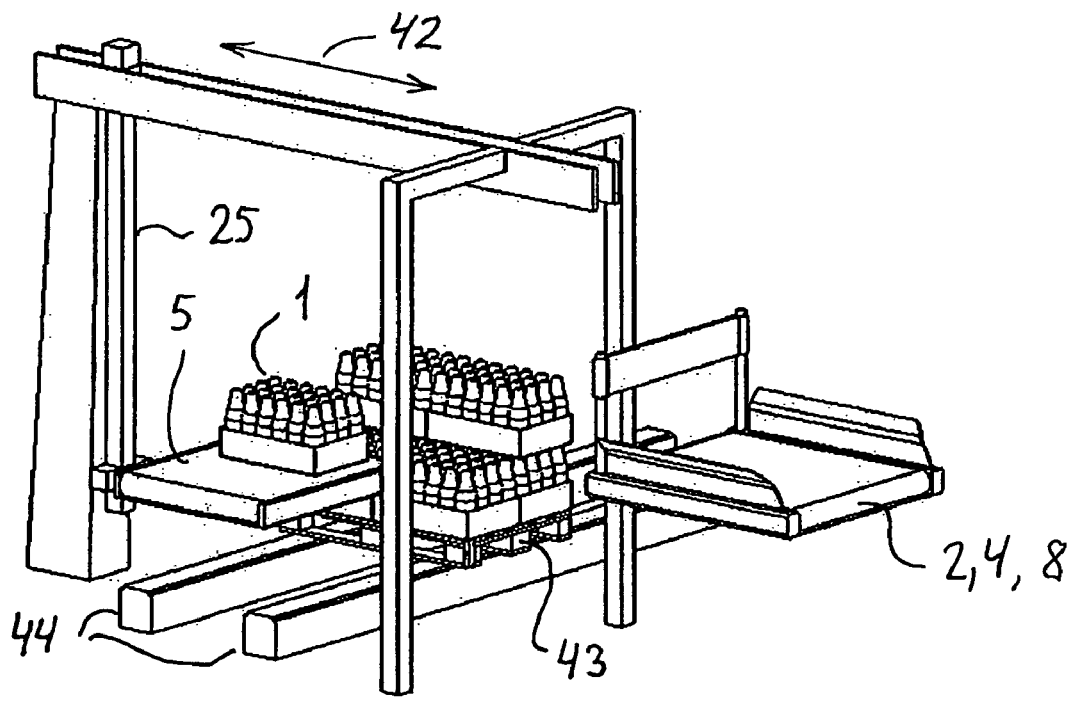

FIG. 26 shows an embodiment of a system according to the invention concerning handling of baggage objects 1 suitable for being placed to form a stack, which objects are aligned on a conveyor 8 with alignment means 2 and measured with measurement means 4 before being transferred to a loading device 5 connected to a two-axis manipulator 25 having a longitudinal axis 42. The objects are transferred in a preselected loading pattern according to a transfer algorithm to a storage device in form of a pallet 43. The pallet 43 is supported on, indexed and transported by two conveyor means 44, here shown as chain conveyors. The baggage objects 1 are received correctly with respect to upside-down orientation, e.g. provided at check-in, but having random horizontal orientation. By aligning and measuring the objects is it determined how the objects are oriented, and they may hence be turned 90 degrees, or not, depending on the actual orientation. In the shown embodiment, the conveyors 44 are used to provide indexing of the pallet 43 in the longitudinal direction of the conveyors 44, i.e. to provide displacement along an axis perpendicular to the two axes of the manipulator 25. Alternatively a three axis manipulator may be used, e.g. for transferring objects to stationary storage means. Other combinations of manipulators may also be used or combined.

Figure 11:
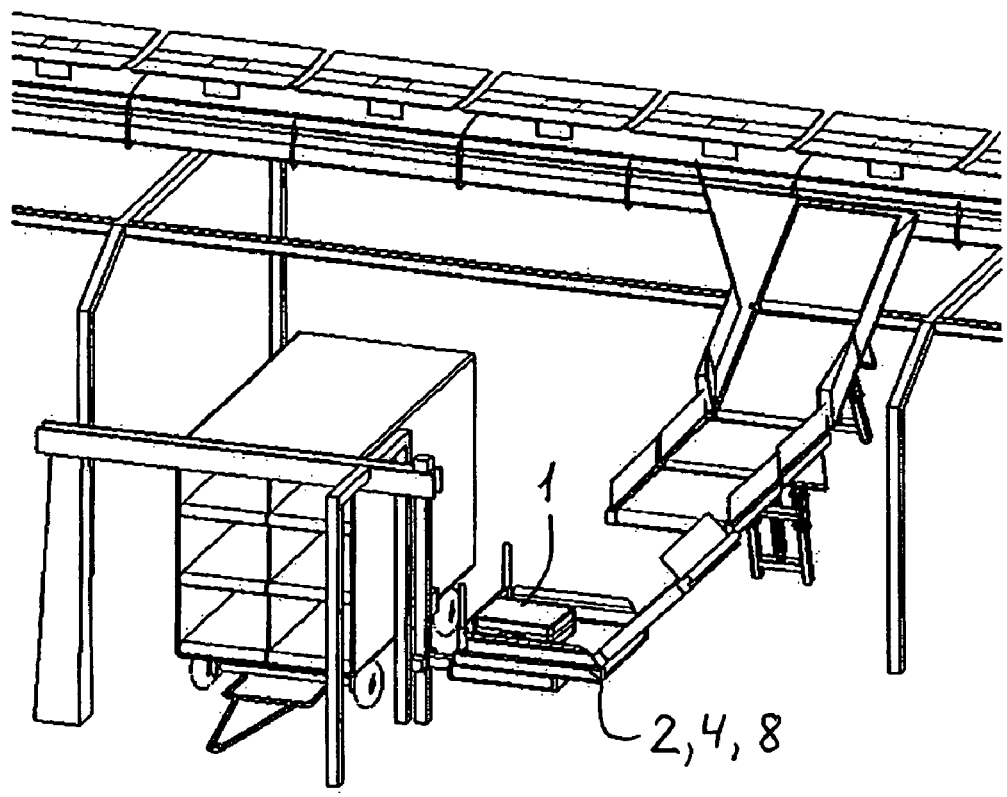
FIG. 11-15 are a sequence of perspective views of elements comprised in an embodiment of a system according to the invention, which show how an object is turned before being transferred to a storage device.
Figure 12:
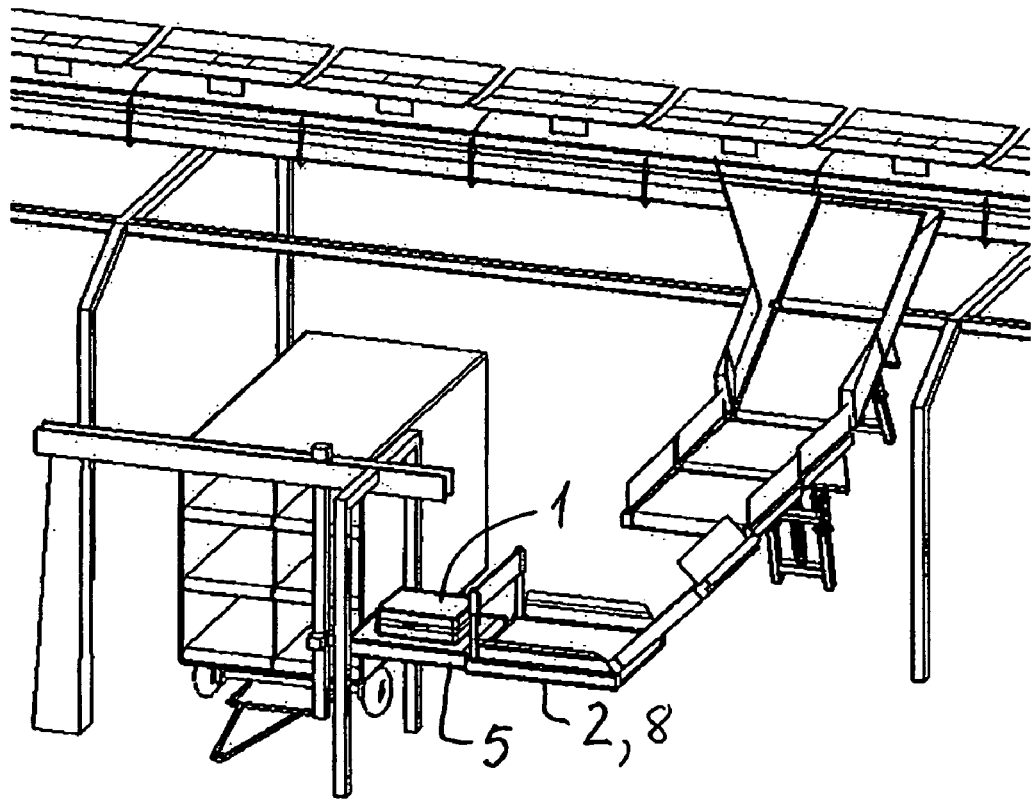
Figure 13:
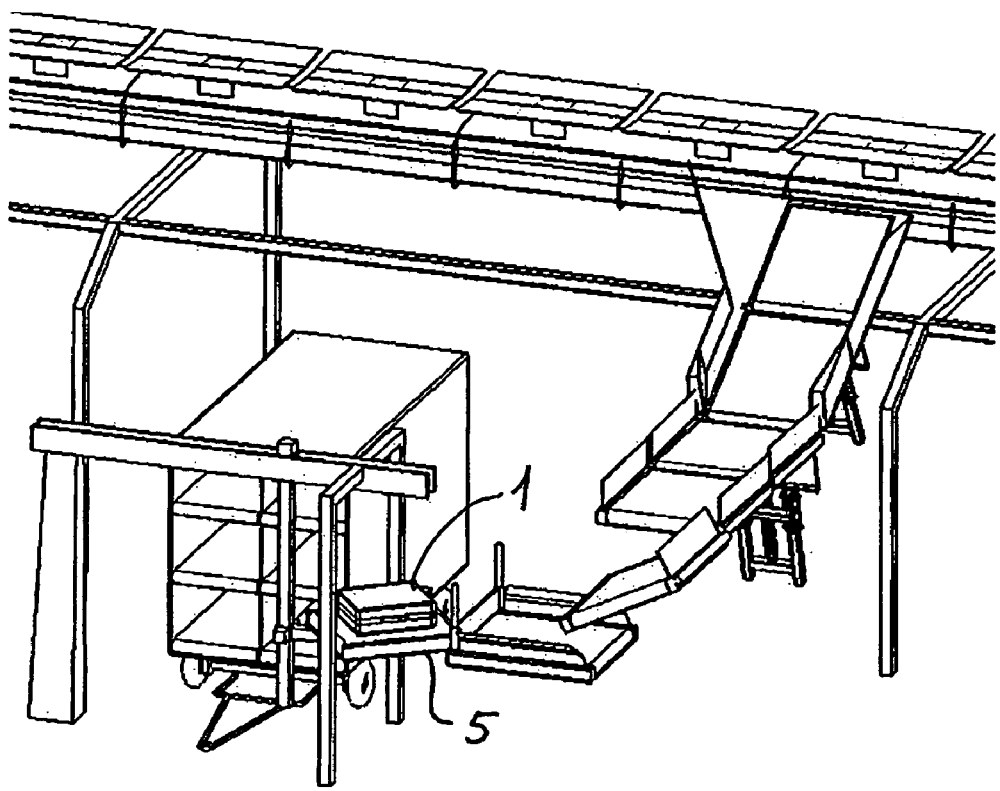
Figure 14:
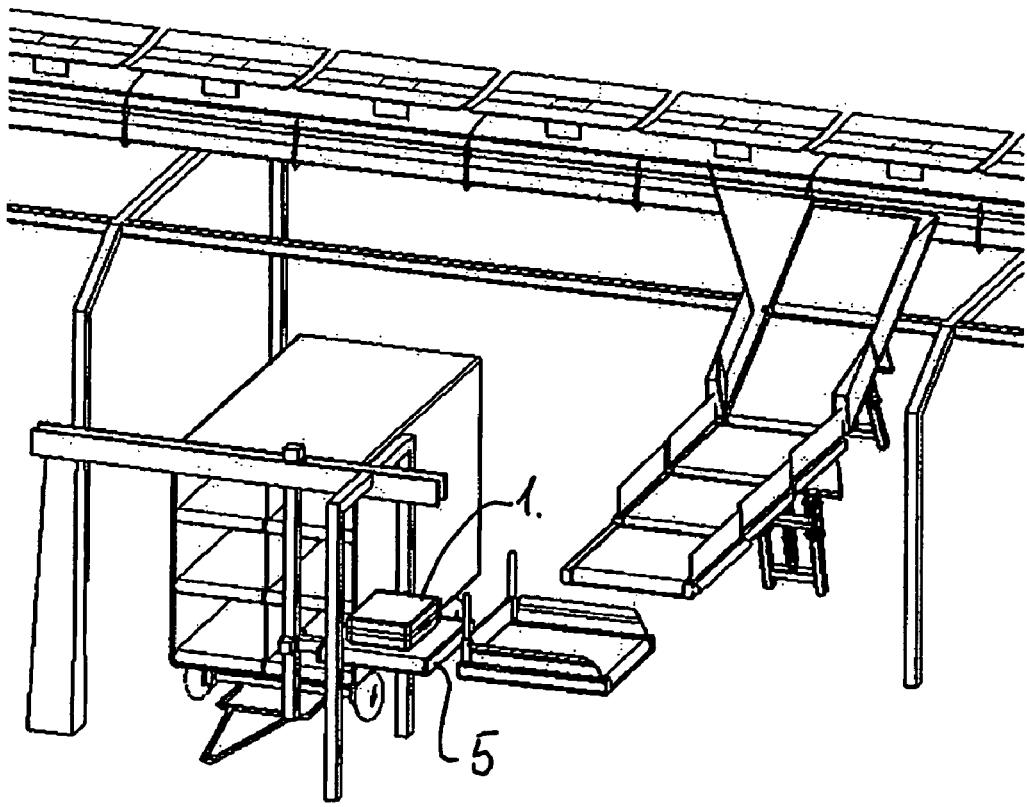
Figure 27:
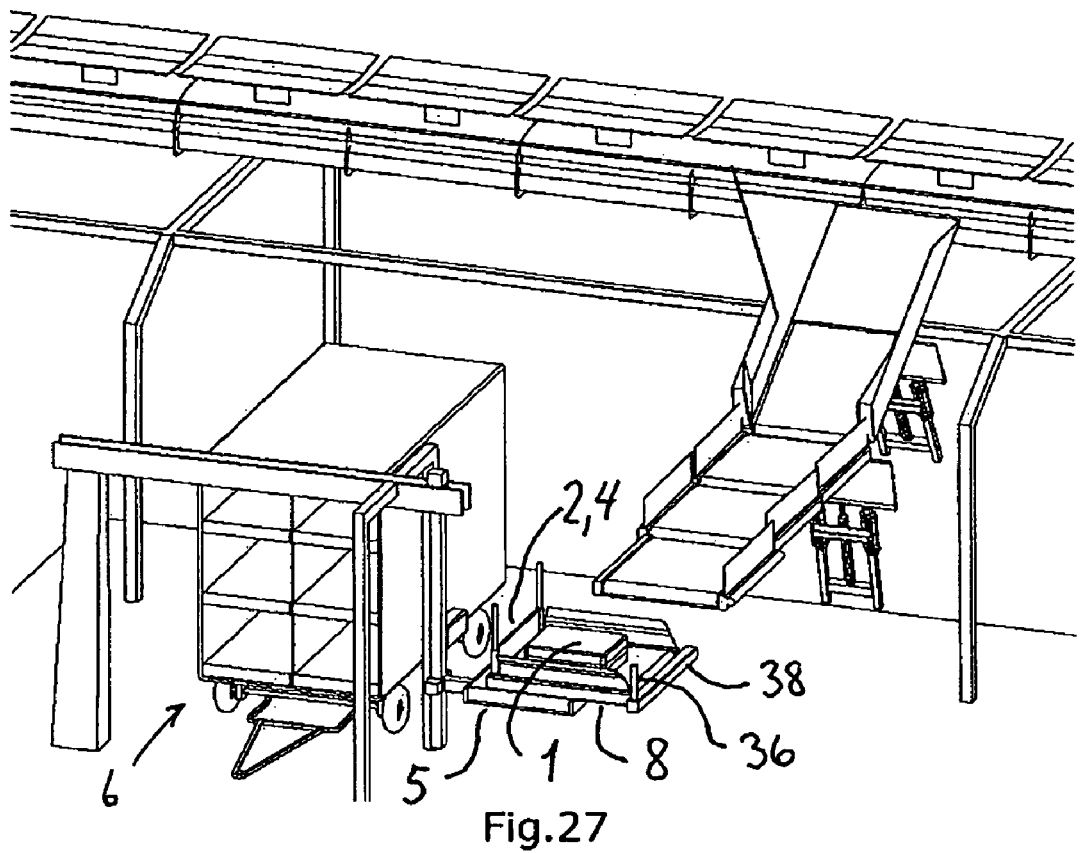
FIG. 27-30 are perspective views of a further embodiment of a system according to the invention, where objects are selectively turned in an alternative manner to the one depicted in FIGS. 11-15.
Figure 28:
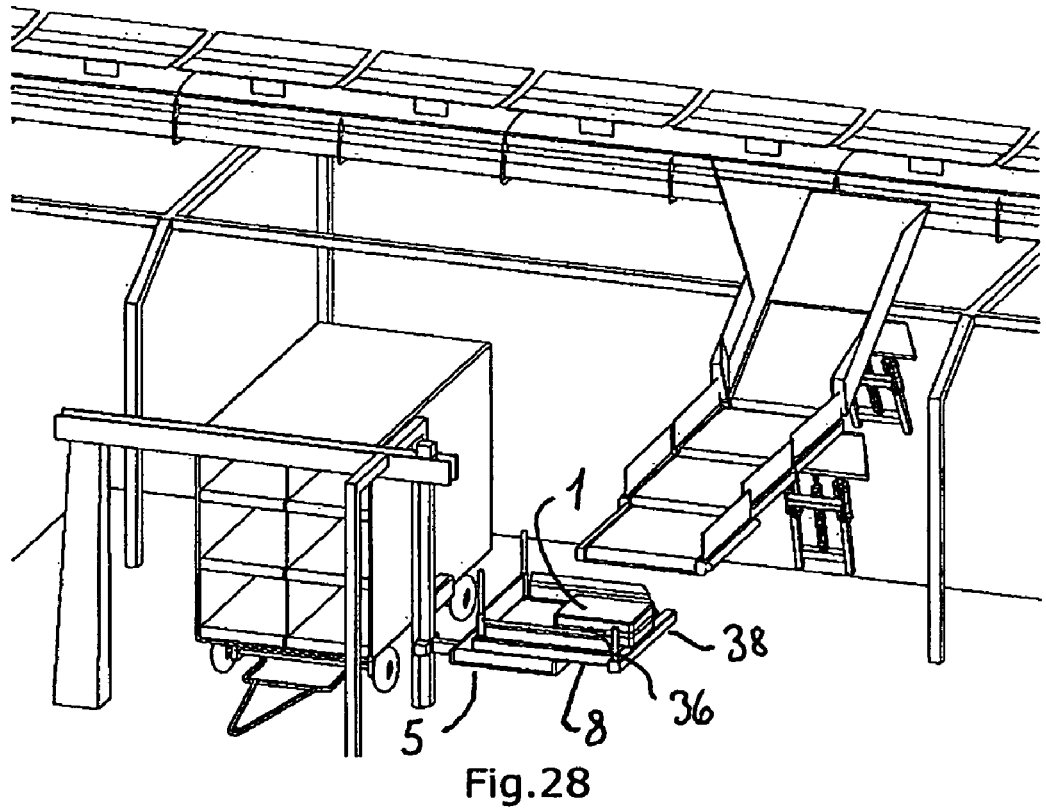
Figure 29:
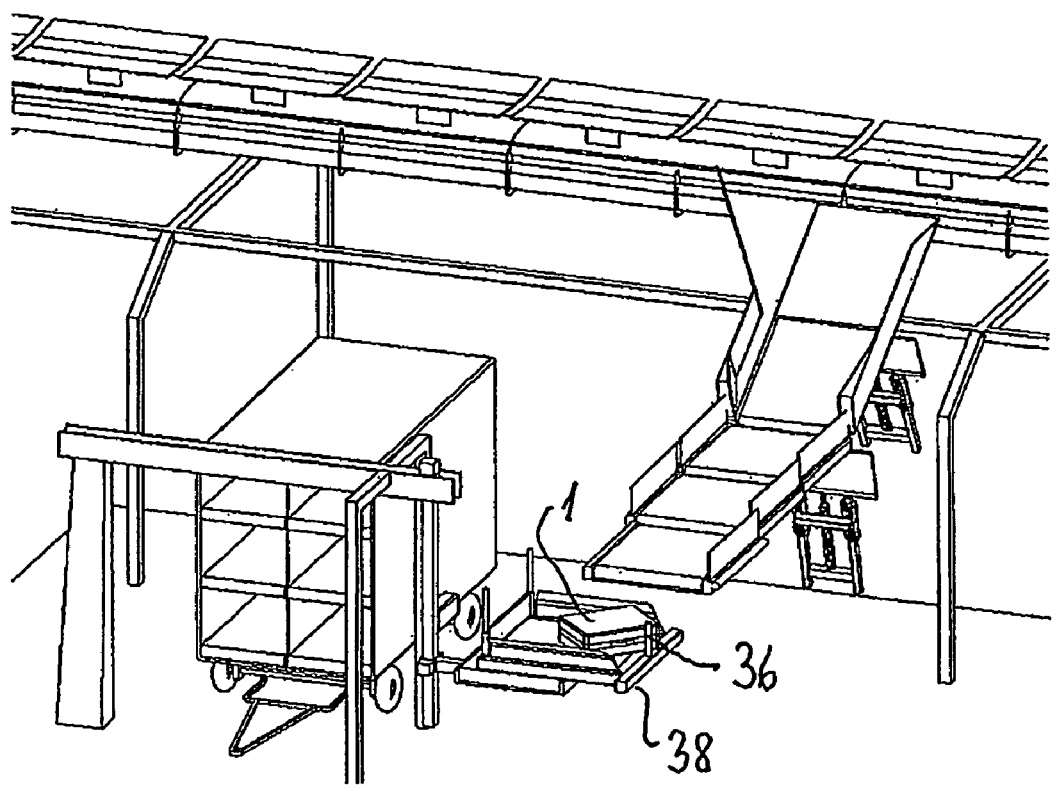
Figure 30:
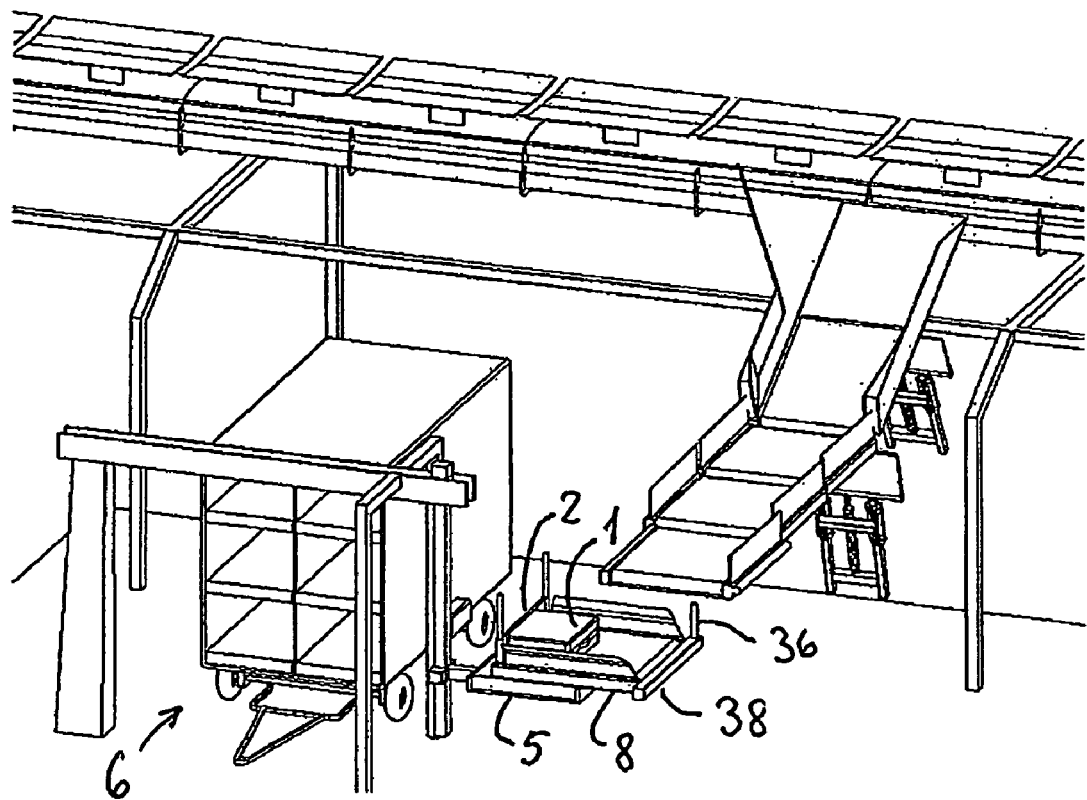

The situation of FIG. 27 basically corresponds to the situation of FIG. 11. An object 1 has arrived at the alignment and measurement means 2, 4 at the conveyor 8. It is selected that the object 1 must be turned before being transferred to the storage device, here a wagon 6. In stead of turning the object with the loading means 5, a pusher device is used, which comprises a pusher element 36 and means for moving the pusher element 36 in a direction transverse of the conveyor 8. After aligning and measuring the object 1 the conveyor 8 is reversed to position the object in an upstream position by the pusher element 36 as displayed in FIG. 28. At this point the pusher element 36 is moved towards and against an upstream end of the object 1, see FIG. 29. It is hereby turned in an angle at least such that when the object 1 is moved downstream again and aligned by the alignment means 2, cf. FIG. 30, the object 1 will have turned approximately 90 degrees and may now be transferred to the wagon 6 without further turning, in a manner as displayed in and corresponding to FIGS. 7-10.

The pusher element 36 may be used to either turn the object 1 clockwise or counter-clockwise. This is a matter of choice.

However, in case e.g. a camera with image processing is used to e.g. recognise position of handles etc., the pusher element 36 may be used to e.g. turn the object 1 such that said handles are always oriented in a preferred direction.

The figures show embodiments including an alignment function, i.e. where the objects are given a pre-orientation prior to being selectively turned. It is to be noted that instead of the alignment function, the objects may selectively be turned to a final orientation without the use of an alignment function. This operation may be performed in any position upstream of the transferal of the objects to the storage device. Such turning may be effectuated by use of mechanical/pneumatic pushers, a turntable etc., and based on measurement of the angular orientation of the objects on the conveyor means, e.g. by using electronic imaging and processing means such as a CCD camera and a computation unit, a laser line scanner, etc.

Unless otherwise expressly stated, the term conveyor means is throughout, in the present document, to be construed as any device, apparatus or system capable of moving objects, such as belt conveyors, roller conveyors, chutes, slides and including pneumatical/hydraulical pushers, etc., which are trivial selections for the skilled person.

It is to be understood that the invention as disclosed in the description and in the figures may be modified and changed and still be within the scope of the invention as claimed hereinafter.

The invention claimed is:

1. An automated baggage handling system adapted to handle baggage objects of variable sizes, shapes and consistencies, including baggage in an airport, where the system comprises a plurality of conveyor means for transporting objects from a first area to a second area where objects are loaded on or in storage devices, said system further comprising:
   control means for controlling automatic operation of the system,
   measurement means for measuring at least length in two substantially perpendicular directions of the objects while the objects are supported on conveyor means, said directions being substantially parallel to a supporting surface of a conveyor means supporting the objects while they are measured, and where at least one of said directions is along or substantially parallel to a side face of the objects,
   loading means provided for receiving objects from the conveyor means and for transferring said objects according to a preselected transfer algorithm to at least one storage device to collect a plurality of objects, and
   orientation means for selectively turning objects in a substantially horizontal plane, while said objects are supported on conveyor means, and where the control means are adapted to control the orientation of selected objects according to a selection in response to at least the measured lengths in relation to at least one predetermined value, before the objects are transferred to the storage device.

2. System according to claim 1, where the system comprises alignment means for aligning angular orientation of the objects before said objects are measured and while said objects are supported on conveyor means, and where the control means, according to a selection in response to at least the measured lengths in relation to the at least one predetermined value, are adapted to control the orientation means to provide a turn of selected objects in a predetermined angle between 80 and 100 degrees, relative to a non-selected object, before the objects are transferred to the storage device.

3. System according to claim 1, where the measurement means includes means for measuring angular orientation of the objects while said objects are supported on conveyor means, and where the control means are adapted to control the orientation means to turn selected objects according to at least a selection in response to the measured lengths in relation to at least one predetermined value and according to the measured angular orientation of the objects, before the objects are transferred to the storage device.

4. System according to claim 2, where the predetermined angle preferably is between 85 and 95 degrees, or more preferably between 89 and 91 degrees.

5. System according to claim 1, where the orientation means are integrated with the loading means.

6. System according to claim 1, where the orientation means comprise a pushing device including a pusher element and means for moving the pusher element in a direction transverse of the conveyor means in order to turn objects in a substantially horizontal plane, while said objects are supported on conveyor means, said pushing device preferably being positioned at an upstream end of a conveyor means or between two consecutive conveyor means.

7. System according to claim 6, where the pushing device is placed upstream to the alignment means.

8. System according to claim 2, where the alignment means include a straight barrier element which the objects are forced against by a conveyor means, and where the barrier element is moved away following alignment to provide free passage of aligned objects.

9. System according to claim 2, where the measurement means include two substantially perpendicular rows of photocells, where each row comprises a sequence of photocells, and where the number of activated photocells in each row provide a measurement of the length of the objects in a direction along each row.

10. System according to claim 1, where the measurement means include electronic image recording and processing means.

11. System according to claim 1, where loading means includes a conveyor means, preferably of a belt or roller type conveyor, connected to a manipulator, said manipulator being provided for moving the conveyor means along at least two axes, said axes being substantially perpendicular.

12. System according to claim 11, where objects are transferred to the loading means in a direction substantially parallel to a longitudinal axis of the manipulator.

13. System according to claim 1, where the system includes object detection means which detect the position of an object on the conveyor means when received, where the detected position is used to control the manipulator such that the object on the conveyor means is moved to a centered position relative to the storage device, before the object is transferred to said storage device.

14. System according to claim 1, where the system includes a storage device adapted to provide common transport for a plurality of objects.

15. System according to claim 1, where the system includes at least one storage device comprising a plurality of vertically or horizontally distributed storage positions wherein each at least two objects may be transferred to and stored in.

16. System according to claim 1, where a number of objects are transported on the conveyor means while placed on tray-like supporting members, and where the system comprises means for unloading objects from said supporting members as well as transport means for transporting empty supporting members.

17. System according to claim 16, where a means for unloading comprises means for measuring angular orientation of the supporting members, for orienting the supporting members by rotation to prepare said member for tilting, for holding the supporting members during tilting as well as for tilting the supporting members to perform an unloading operation, where the supporting members preferably are tilted about an axis substantially parallel to a longer side of said supporting members.

18. System according to claim 1, where a plurality of individually actuatable conveyor means and object detection means are placed upstream relative to the measurement means for detecting transported objects and separating a sequence of objects such that objects arrive individually at said measurement means.

19. System according to claim 1, where a number of blocking devices are placed on or between the conveyor means to separate individual objects in order to securely maintain a given sequence of objects.

20. System according to claim 19, where the blocking devices preferably are placed at positions where the conveyor means transport the objects in an upwards or downwards direction.

21. System according to claim 20, where the blocking devices comprise a plate-like or finger-like component that may be raised and lowered to respectively perform blocking or un-blocking of objects.

22. Method of automated transport and handling of baggage objects of variable sizes, shapes and consistencies, including baggage in an airport, where a number of objects are transported on a plurality of conveyor means from a first area to a second area where the objects are loaded on or in storage devices, and where the method comprises steps of:
measuring at least length in two substantially perpendicular directions of the objects while the objects are supported on conveyor means, said directions being substantially parallel to a supporting surface of a conveyor means supporting the objects while they are measured, and where at least one of said directions is along or substantially parallel to a side face of the objects,
turning selected objects in a substantially horizontal plane, while said objects are supported on conveyor means, to control the orientation of the objects according to a selection in response to at least the measured lengths in relation to at least one predetermined value, and
transferring oriented objects according to a preselected transfer algorithm to at least one storage device to collect a plurality of objects.

23. Method according to claim 22, where angular orientation of the objects is measured while said objects are supported on conveyor means, and where objects are selectively turned in a substantially horizontal plane and oriented in an angle determined in response to at least the measured lengths in relation to at least one predetermined value and the measured angular orientation of the objects, to control the orientation of the objects before being transferred to the storage device.

24. Method according to claim 22, where angular orientation of the objects is aligned before said objects are measured and while said objects are supported on conveyor means, and where objects are selectively turned in a substantially horizontal plane and oriented in a predetermined angle between 80 and 100 degrees, relative to a non-selected object, while said objects are supported on conveyor means objects, to control the orientation of the objects according to a selection in response to at least the measured lengths in relation to at least one predetermined value, before the objects are transferred to the storage device.

25. Method according to claim 24, where the predetermined angle preferably is between 85 and 95 degrees, or more preferably between 89 and 91 degrees.

26. Method according to claim 23, where angular orientation of the objects is initially aligned and the objects measured, after which selected objects are moved to a position upstream from a position where alignment was initially performed, said selected objects then being turned by moving a pusher element in a direction transverse of the conveyor means to push or draw one end of the objects to a different position, after which the objects are moved downstream and aligned again, thereby controlling the orientation of the objects according to a selection in response to at least the measured lengths in relation to at least one predetermined value, before the objects are transferred to the storage device.

27. Method according to claim 26, where the conveyor means are activated in an upstream direction while the selected objects are being pushed or drawn to a different position in order to push the object against the pusher element in upstream direction to increase the turn of the objects.

28. Method according to claim 26, where the method includes measuring the objects again after turning.

29. Method according to claim 22, where the selection in response to the measured lengths involves that objects, where one length is larger and the other length is smaller than the at least one predetermined value, are turned if a side of the object, having said larger length, is facing the storage device at the time of transferral.

30. Method according to claim 22, where the selection in response to the measured lengths involves that objects, where both lengths are smaller than the at least one predetermined value, are turned if a side of the object, having a length which is smaller than the other length, is facing the storage device at the time of transferral.

31. Method according to claim 22, where the at least one predetermined value corresponds to a width of a storage position on or in the storage device, or less.

32. Method according to claim 22, where the transfer algorithm includes selecting a position from a plurality of positions in or on a storage device, or selecting a specific storage device from a plurality of storage devices, according to destination in order to load storage devices with objects destined for more than one destination.

33. Method according to claim 22, where the transfer algorithm includes selecting a position from a plurality of positions in or on a storage device or selecting a specific storage device from a plurality of storage devices according to travel class.

34. Method according to claim 22, where the transfer algorithm includes selecting a position from a plurality of positions in or on a storage device or selecting a specific storage device from a plurality of storage devices according to weight.

35. Method according to claim 22, where the transfer algorithm includes selecting a position from a plurality of positions in or on a storage device or selecting a specific storage device from a plurality of storage devices according to at least one measured length.

36. Method according to claim 35, where the transfer algorithm includes saving information regarding the selected positions in or on a storage device or the selected specific storage device and the according measured lengths of objects stored in said positions or specific devices.

37. Method according to claim 36, where at least two objects are stored in each position or specific device and the transfer algorithm includes selecting a position from a plurality of positions in or on a storage device or selecting a specific storage device from a plurality of storage devices according to the information regarding previously selected positions in said positions or specific devices.

38. Method according to claim 22, where the objects remain supported on conveyor means throughout the transport and handling until transferred to the storage device.

39. Method according to any one of claims 22-38, where the method is used for handling baggage in an airport and where the baggage is transported, handled and transferred to the storage device essentially in a sequence determined exclusively in response to destination.

* * * * *